(12) United States Patent
Laake

(10) Patent No.: US 9,964,654 B2
(45) Date of Patent: May 8, 2018

(54) SEISMIC ATTRIBUTE COLOR MODEL TRANSFORM

(71) Applicant: Schlumberger Technology Corporation, Sugar Land, TX (US)

(72) Inventor: Andreas W. Laake, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1360 days.

(21) Appl. No.: 13/851,327

(22) Filed: Mar. 27, 2013

(65) Prior Publication Data

US 2013/0262061 A1    Oct. 3, 2013

Related U.S. Application Data

(60) Provisional application No. 61/699,986, filed on Sep. 12, 2012, provisional application No. 61/616,497, filed on Mar. 28, 2012.

(51) Int. Cl.
*G01V 1/34* (2006.01)
*G06T 5/00* (2006.01)

(52) U.S. Cl.
CPC ............. *G01V 1/345* (2013.01); *G06T 5/003* (2013.01); *G06T 2207/10024* (2013.01)

(58) Field of Classification Search
None
See application file for complete search history.

(56) References Cited

U.S. PATENT DOCUMENTS

| 4,843,599 A | 6/1989 | Bucker |
| 4,970,699 A | 11/1990 | Bucker et al. |
| 6,049,759 A * | 4/2000 | Etgen .............. G01V 1/301 702/14 |
| 6,278,949 B1 * | 8/2001 | Alam .............. G01V 1/34 702/16 |
| 6,594,585 B1 * | 7/2003 | Gersztenkorn ...... G01V 1/30 702/14 |
| RE38,229 E * | 8/2003 | Marfurt ............ G01V 1/301 702/16 |

(Continued)

FOREIGN PATENT DOCUMENTS

| CN | 101408942 A | 4/2009 |
| CN | 102831420 A | 12/2012 |

(Continued)

OTHER PUBLICATIONS

Chopra, S. & Marfurt K. "Seimic Attributes for Prospect Identification and Reservoir Characterization" SEG Books (2007).*

(Continued)

*Primary Examiner* — Kamini S Shah
*Assistant Examiner* — Jay B Hann
(74) *Attorney, Agent, or Firm* — Michael Guthrie

(57) ABSTRACT

A method can include providing data from at least two data sets in a continuous color model that includes at least two color axes; transforming the data from the continuous color model to a hue, saturation and value color model to generate at least saturation data; applying an edge detection algorithm to the saturation data to generate enhanced data; and rendering at least a portion of the enhanced data to a display. Various other apparatuses, systems, methods, etc., are also disclosed.

17 Claims, 26 Drawing Sheets
(16 of 26 Drawing Sheet(s) Filed in Color)

(56) References Cited

U.S. PATENT DOCUMENTS

| | | | | |
|---|---|---|---|---|
| 6,950,751 | B2* | 9/2005 | Knobloch | G01V 1/34 702/16 |
| 6,989,841 | B2* | 1/2006 | Docherty | G06T 11/206 345/629 |
| 7,218,573 | B1* | 5/2007 | Laake | G01V 1/364 345/603 |
| 7,308,139 | B2* | 12/2007 | Wentland | G01V 1/34 382/109 |
| 8,213,261 | B2* | 7/2012 | Imhof | G01V 1/32 367/14 |
| 2004/0204859 | A1 | 10/2004 | Knobloch | |
| 2011/0002194 | A1 | 1/2011 | Imhof et al. | |
| 2011/0085418 | A1* | 4/2011 | Laake | G01V 1/301 367/38 |
| 2013/0083968 | A1 | 4/2013 | Sakamoto | |

FOREIGN PATENT DOCUMENTS

| | | |
|---|---|---|
| CN | 103065141 A | 4/2013 |
| JP | 2001197321 A | 7/2001 |
| KR | 1020120071465 A | 7/2012 |
| WO | 2011154978 A2 | 12/2011 |

OTHER PUBLICATIONS

Chopra, et al., "Coherence and curvature attributes on preconditioned seismic data", The Leading Edge, vol. 30 (4), Apr. 2011, pp. 386-393.

Chopra, et al., "Emerging and future trends in seismic attributes", The Leading Edge, vol. 27 (3), Mar. 2008, pp. 298-318.

Chopra, et al., "Seismic Attributes for Stratigraphic Feature Characterization", SEG Annual Meeting, Las Vegas, Nevada, Nov. 9-14, 2008, pp. 1590-1594.

Chopra, et al., "Seismic Attributes on Frequency-enhanced Seismic Data", SEG Annual Meeting, Denver, Colorado, Oct. 17-22, 2010, pp. 1462-1466, Dorn, G.A., "Computing and Visualization", The Leading Edge, vol. 21 (6), Jun. 2002, pp. 581-586.

Dunbar, et al., "Color-encoding multifrequency acoustic data for near-bottom studies", Geophysics, vol. 65 (3), 2000, pp. 994-1002.

Laake, Andreas, "Structural mapping with spectral attributes", 82nd Annual SEG Meeting, Las Vegas, Nov. 4-9, 2012, pp. 1-5.

Partyka, et al., "Interpretational applications of spectral decomposition in reservoir characterization", The Leading Edge, vol. 18 (3), Mar. 1999, pp. 353-360.

Examination Report for the equivalent UK patent application 1305720.3 dated Dec. 22, 2017.

* cited by examiner

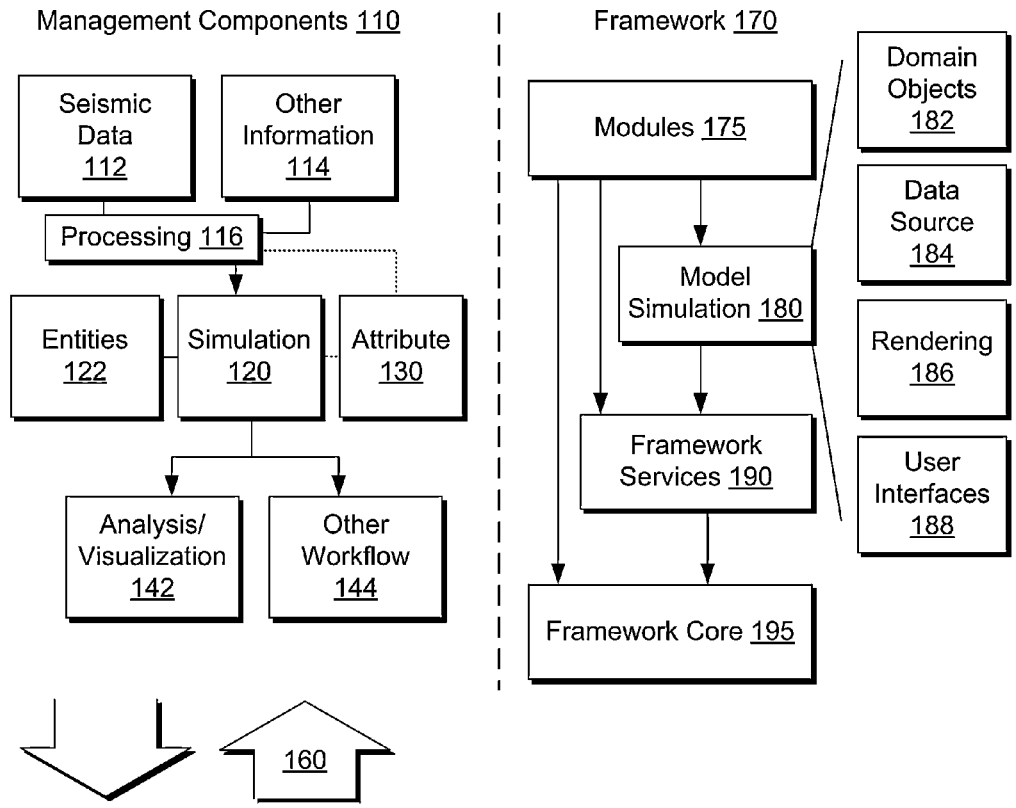
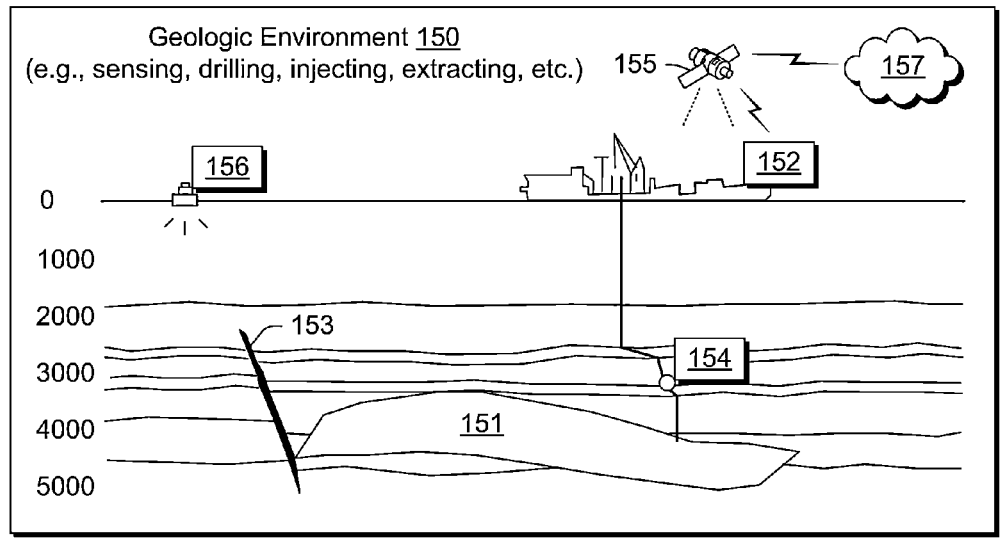
Fig. 1

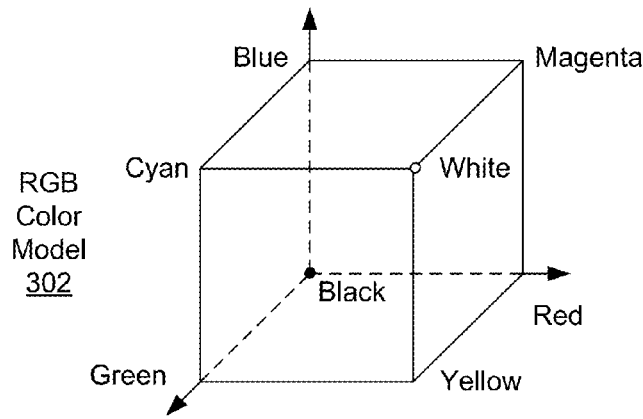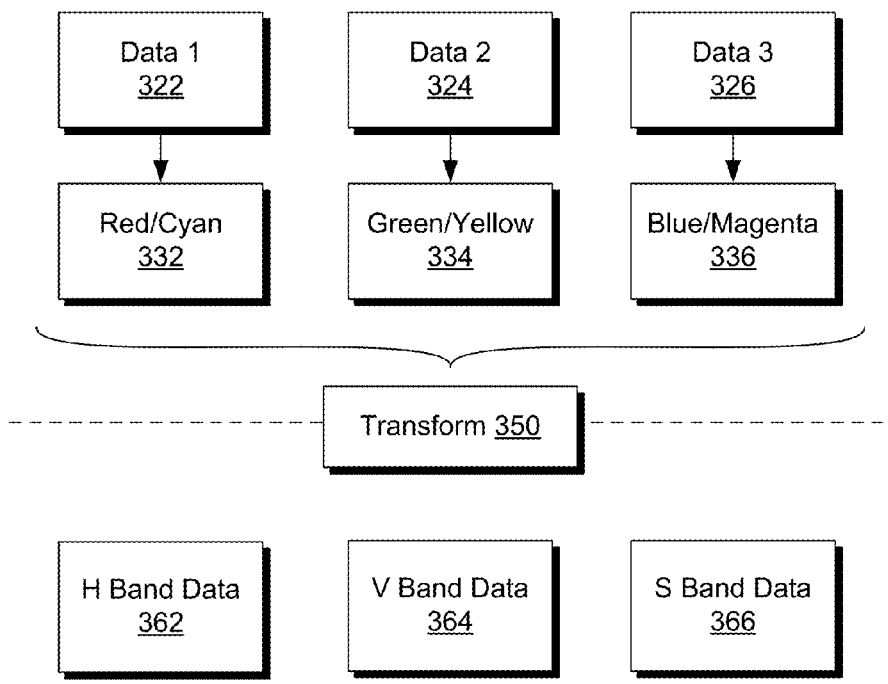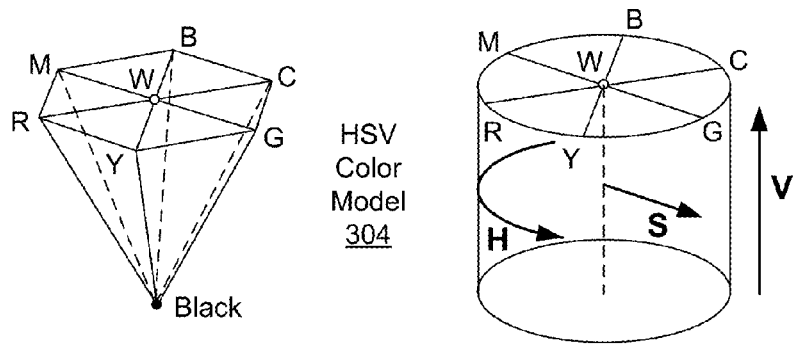
Fig. 3

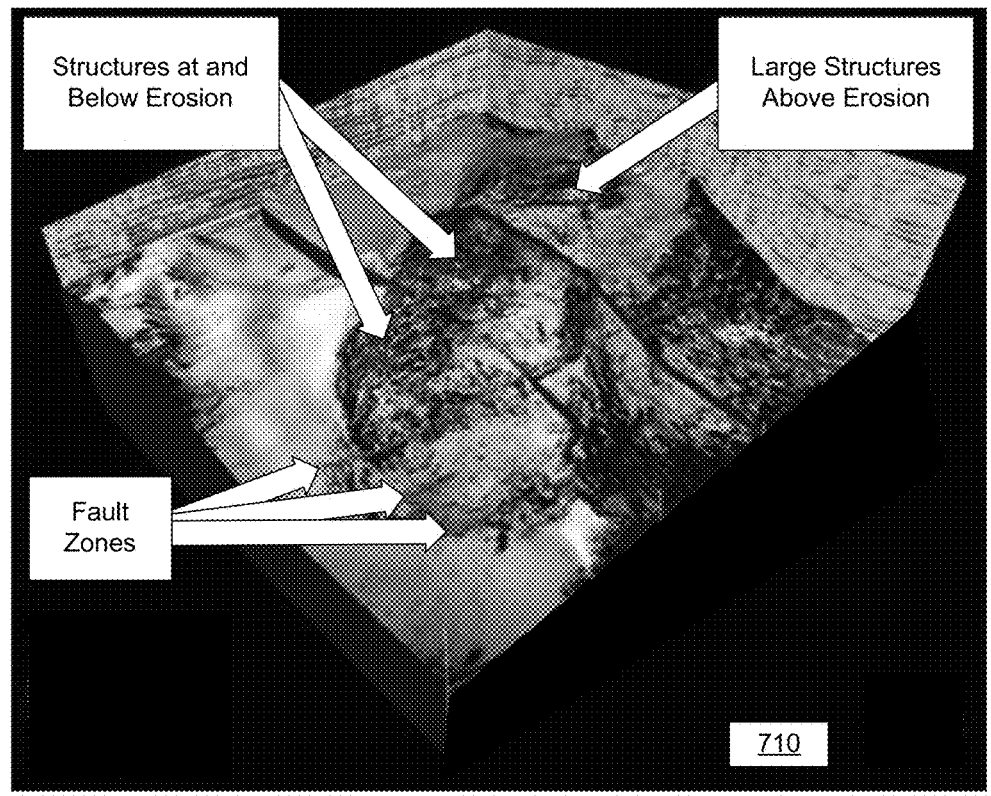
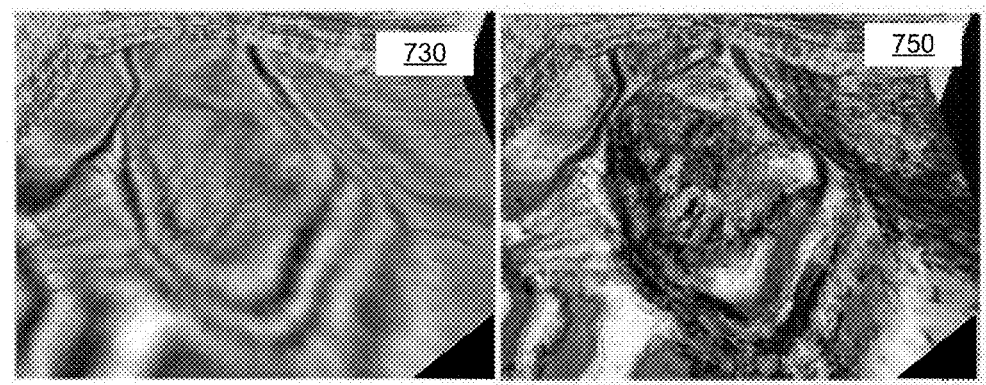
Fig. 7

Workflows 800

Sharpened RGB-based Workflows 810

- Guided Extraction of Structure/Texture 812
- Discrimination Through Texture 814
- Integration of Structural Data 816

Conditioning/Processing Workflows 830

- Sharpening 832
- Tracking 834
- Marbleizing 836

Lithology/Structural Workflows 850

- Sharpening Salt (e.g., salt bodies) 852
- SRGB-based Map of Salt Texture/Stress 854
- Extraction Intra-Salt (e.g., dirty salt) 856
- Fracture Extraction (e.g., brittle limestone) 858
- Dissolution Features 862
- Discrimination Brittle Rock(s) 864
- Mapping Folds/Faults 866

Fig. 8

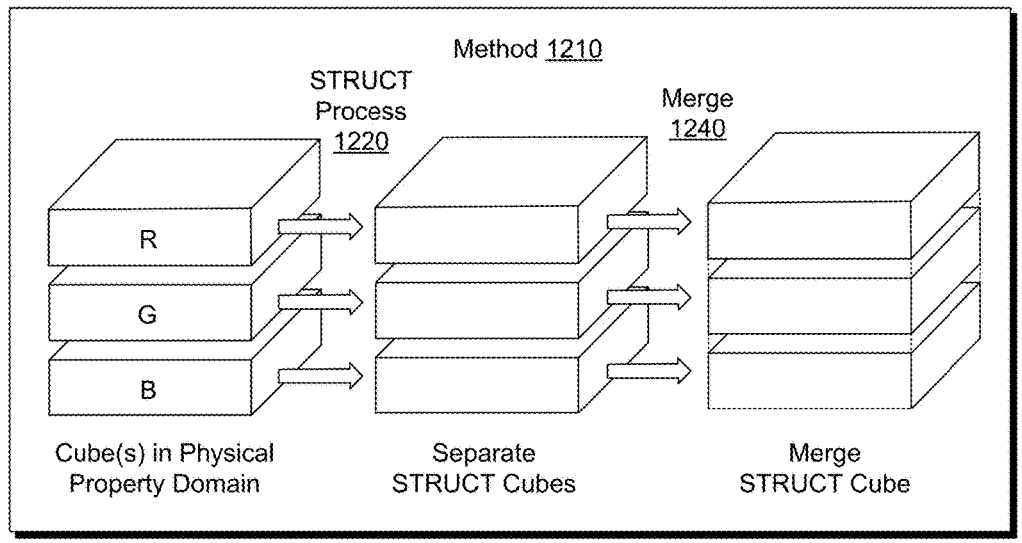
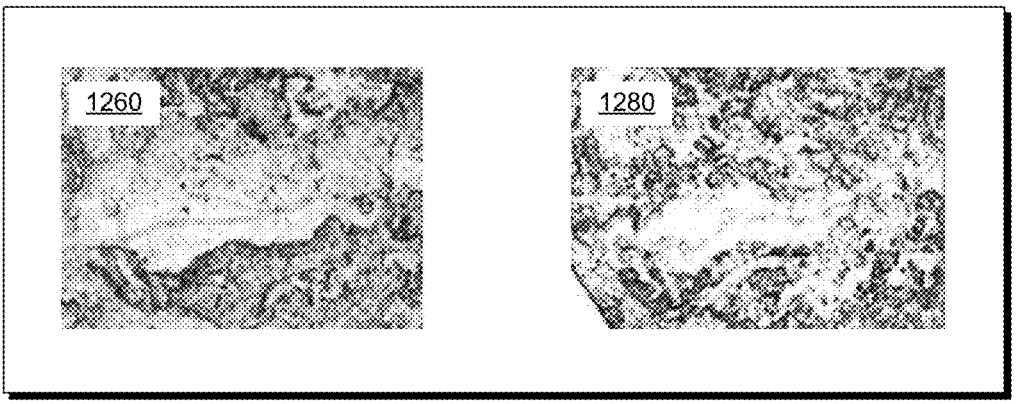
Fig. 12

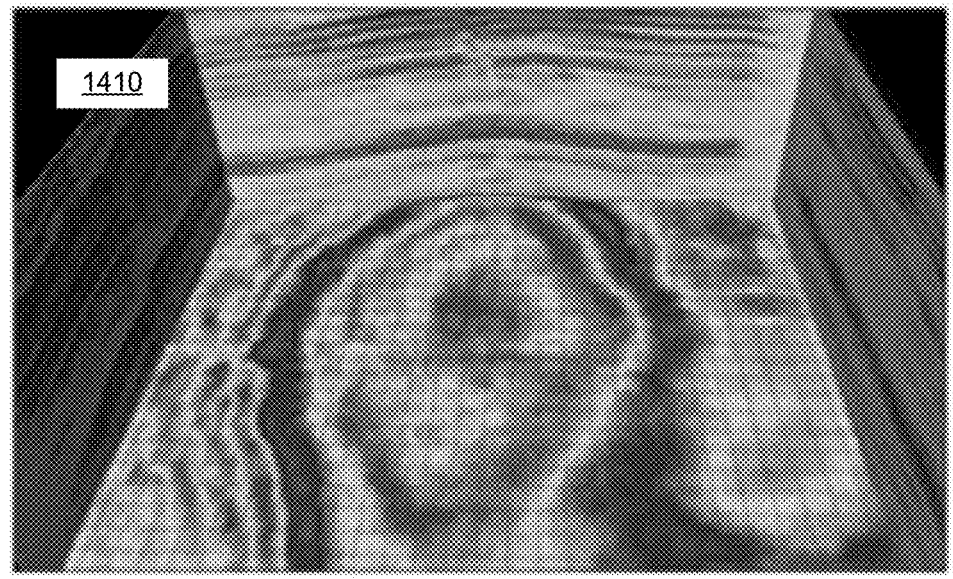
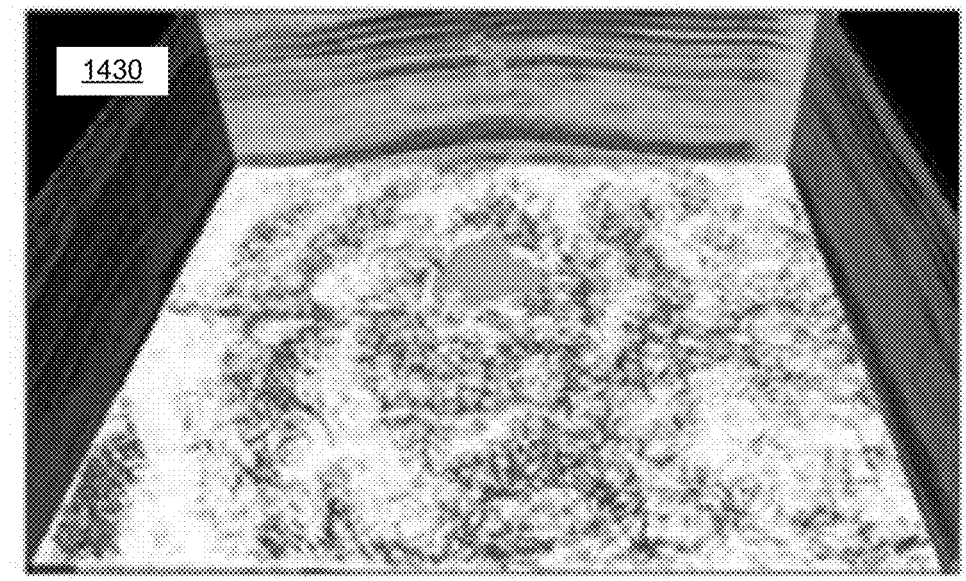
Fig. 14

SEISMIC ATTRIBUTE COLOR MODEL TRANSFORM

RELATED APPLICATIONS

This application claims the benefit of U.S. Provisional Patent application having Ser. No. 61/699,986, filed 12 Sep. 2012, entitled "Extended Multi-Attribute RGB Processing", which is incorporated by reference herein, and U.S. Provisional Patent Application having Ser. No. 61/616,497, filed 28 Mar. 2012, entitled "Extraction of Information from Seismic Data Using Multiple Attributes", which is incorporated by reference herein.

BACKGROUND

Reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks. Various techniques described herein pertain to processing of data such as, for example, seismic data.

SUMMARY

A method can include providing data from at least two data sets in a continuous color model that includes at least two color axes; transforming the data from the continuous color model to a hue, saturation and value color model to generate at least saturation data; applying an edge detection algorithm to the saturation data to generate enhanced data; and rendering at least a portion of the enhanced data to a display. A method may include merging of enhanced data with input data to structurally sharpen input data prior to further processing. A system can include one or more processors for processing information; memory operatively coupled to the one or more processors; and modules that include instructions stored in the memory and executable by at least one of the one or more processors, where the modules may include a continuous color model module for providing data from at least two data sets in a continuous color model; a transformation module for transforming the data from the continuous color model to a hue, saturation and value color model to generate at least saturation data; and an application module for applying an edge detection algorithm to the saturation data to generate enhanced data. One or more computer-readable storage media can include computer-executable instructions to instruct a computing system to access data; process the data to derive linear feature data; process the data to derive curved feature data; and combine at least a portion of the linear feature data and at least a portion of the curved feature data.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The patent or application file contains at least one drawing executed in color. Copies of this patent or patent application publication with color drawing(s) will be provided by the Patent and Trademark Office upon request and payment of the necessary fee.

Features and advantages of the described implementations can be more readily understood by reference to the following description taken in conjunction with the accompanying drawings.

FIG. 1 illustrates an example system that includes various components for modeling a geologic environment;

FIG. 3 illustrates an example of a method for transforming data to one or more bands of a HSV color model;

FIG. 7 illustrates examples of images of data associated with a workflow;

FIG. 8 illustrates examples of workflows;

FIG. 12 illustrates an example of a method and examples of images of data associated with a workflow;

FIG. 14 illustrates examples of images of data associated with a workflow that includes ant tracking;

DETAILED DESCRIPTION

Figure 2:
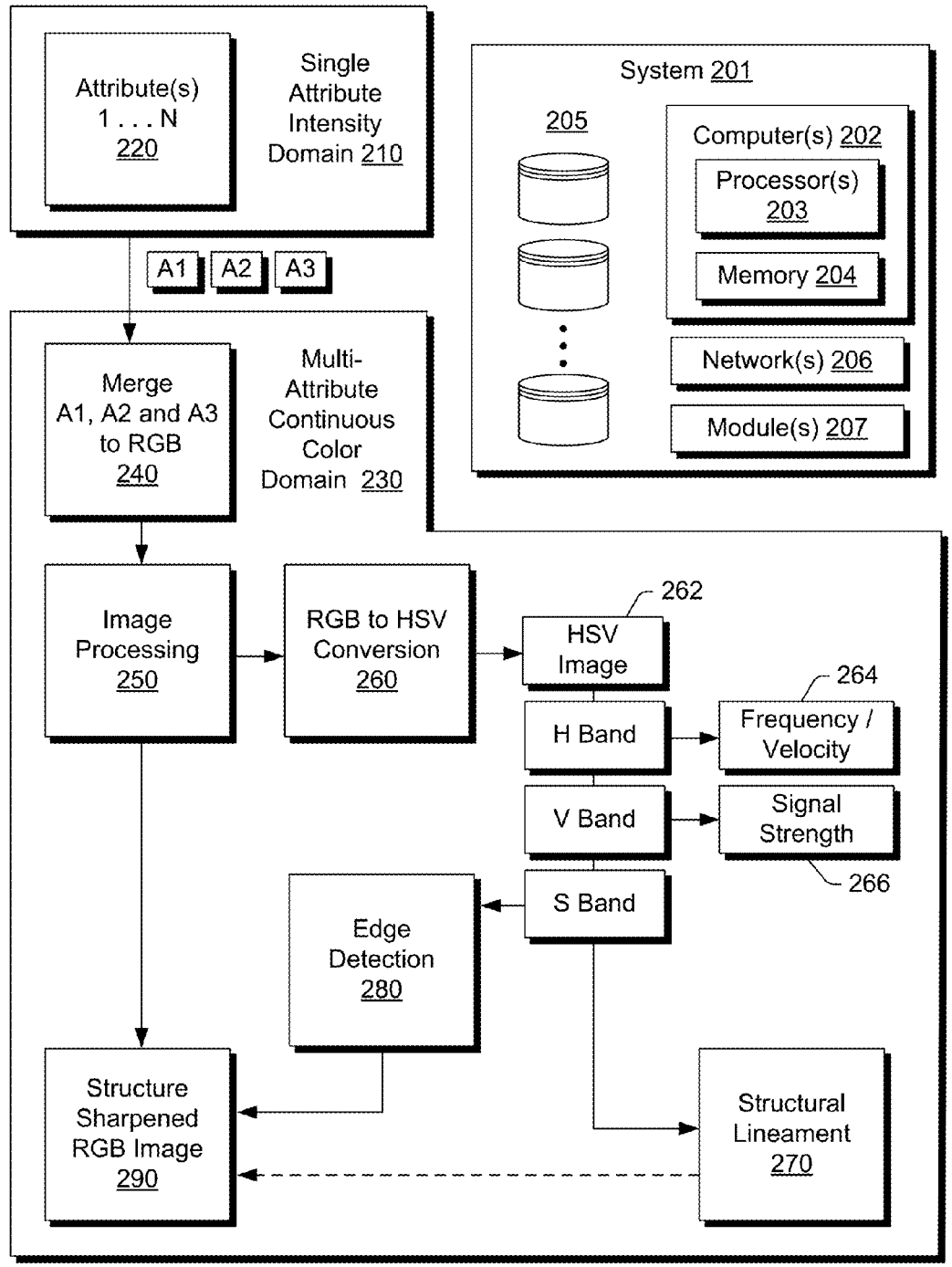
FIG. 2 illustrates an example of a method for converting data in an RGB color model to at least saturation band data of a HSV color model and an example of a system.

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

FIG. 1 shows an example of a system 100 that includes various management components 110 to manage various aspects of a geologic environment 150 (e.g., an environment that includes a sedimentary basin, a reservoir 151, one or more fractures 153, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may rely on a software framework such as an object-based framework. In such a framework, entities may include entities based on pre-defined classes to facilitate modeling and simulation. A commercially available example of an object-based framework is the MICROSOFT® .NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results. As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a reservoir or reservoirs may be simulated with respect to one or more enhanced recovery techniques (e.g., consider a thermal process such as steam-assisted gravity drainage (SAGD), etc.).

In an example embodiment, the management components 110 may include features of a commercially available simulation framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of simulating a geologic environment).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization. Such a model may include one or more grids.

The model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

In the example of FIG. 1, the domain objects 182 can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may be outfitted with any of a variety of sensors, detectors, actuators, etc. For example, equipment 152 may include communication circuitry to receive and to transmit information with respect to one or more networks 157. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite 155 that may be configured for communications, noting that the satellite 155 may additionally or alternatively include circuitry for imagery (e.g., spatial, spectral, temporal, radiometric, etc.).

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework.

As an example, a workflow may include one or more worksteps that access a module such as a plug-in (e.g., external executable code, etc.). As an example, consider a workstep that includes instructions to access an algorithm of a package, a computing environment, etc., such as, for example, the MATLAB® computing environment (marketed by MathWorks, Inc., Natick, Mass.). The MATLAB® computing environment includes an image processing toolbox, for example, with algorithms for color space (e.g., color model) conversions, transforms, etc. As an example, the MATLAB® computing environment includes functions "rgb2hsv" and "hsv2rgb" to convert images between the RGB and HSV color spaces (see, e.g., www.mathworks.com).

As to examples of color models, the RGB color model defines a color as percentages of red, green, and blue hues (e.g., as mixed together) while the HSV color model defines color with respect to hue (H), saturation (S) and value (V). For the HSV color model, as hue varies from 0 to 1.0, corresponding colors vary from red through yellow, green, cyan, blue, magenta, and back to red (e.g., red values exist at both at 0 and 1.0); as saturation varies from 0 to 1.0, corresponding colors (hues) vary from unsaturated (e.g., shades of gray) to fully saturated (e.g., no white component); and as value, or brightness, varies from 0 to 1.0, corresponding colors become increasingly brighter.

Saturation may be described as, for example, representing purity of a color where colors with the highest saturation may have the highest values (e.g., represented as white in terms of saturation) and where mixtures of colors are represented as shades of gray (e.g., cyans, greens, and yellow shades are mixtures of true colors). As an example, saturation may be described as representing the "colorfulness" of a stimulus relative to its own brightness; where "colorfulness" is an attribute of a visual sensation according to which the perceived color of an area appears to be more or less chromatic and where "brightness" is an attribute of a visual sensation according to which an area appears to emit more or less light.

As an example, information may be extracted from seismic data using one or more attributes, for example, where each attribute represents a specific characteristic or characteristics of the data. As an example, seismic data may be provided in the form of a "cube" (e.g., a polyhedron) or otherwise organized with respect to three dimensions, for example, crossline and inline dimensions (e.g., x and y) as well as a time or depth dimension (e.g., t or z, where time is a proxy for depth via wave travel time). Where a "cube" is mentioned herein, as an example, it may refer to a three-dimensional data set.

Examples of attributes may include dominant frequency, RMS amplitude and spatial variance. To describe a geological feature or geological features, a method may include an analysis of information from multiple attributes. As an example, a method may provide for simultaneous attribute analysis by representing attribute duplets or triplets in a continuous color representation. For example, for duplets, a color model using RG, GB or RB may be implemented; whereas, for triplets, a color model using RGB may be implemented. Whether for duplets or triplets, a full or truncated RGB color model may be transformed or converted to another type of color model that includes saturation. For example, a color model may be converted or transformed to a HSV color model.

As an example, a method may include sharpening of a continuous color representation of multiple attributes to provide as a result, for example, structural lineaments for geological interpretation. For example, consider extracting three attributes (attribute triplet) from a seismic data cube (e.g., pre-processed separately). In such an example, the method may include selecting and allocating the three attributes to red, green and blue bands in a continuous color representation (e.g., continuous for an RGB color model). Such an approach can provide a three attribute RGB image with an extended dynamic range where a method can include image processing to enhance the three attribute RGB image. As an example, a method can include converting the three attribute RGB image from the RGB color model to the HSV color model to enhance structural information, which may be, for example, contained in boundaries of the colors in the three attribute RGB image. In such a method, saturation in the HSV color model may represent structural information contained in the three attributes of the RGB image. As an example, a method may include applying one or more edge detection algorithms to the information in the saturation band, for example, to provide structural information as a result. Given such a result, as an example, a method may include convolving the structural information and the three attribute RGB image. In such an example, the result of the convolving may be considered a sharpened RGB image (e.g., a structurally sharpened RGB image).

As an example, a method may include providing a cube containing structural lineaments and a structure sharpened RGB image. While duplets and triplets have been mentioned, such a method may optionally be applied to combinations of more than three attributes. Further, as an example, attributes may stem from disparate data sources. For example, seismic data may be processed to provide two attributes while satellite imagery data may be processed to provide another attribute. In such an example, a three attribute RGB image may be formed and converted to a HSV color model where one or more algorithms are applied to saturation band data. In turn, as an example, the resulting processed saturation band data may be convoluted with the three attribute RGB image (or a truncated form thereof) for purposes of interpretation, further processing, etc. As an example, the aforementioned PETREL® software may be implemented in conjunction with one or more modules that provide for color model transformation, processing of saturation band data, etc.

FIG. 2 shows an example of a method 200 that includes a single attribute intensity domain portion 210 and a multi-attribute continuous color domain portion 230. The method 200 may be implemented to sharpen the continuous color representation of multiple attributes, for example, to provide structural lineaments for geological interpretation.

As an example, seismic data may be provided in a cube configuration (e.g., with respect to crossline, inline and time or depth dimensions). In the single attribute intensity domain portion 210, individual attributes may be displayed individually, for example, as intensities that correspond to their respective attribute values. In other words, a seismic cube may be processed via an attribute block 220 to generate an attribute cube where values for a slice through the attribute cube may be displayed as grayscale intensities that correspond to those values. As to the multi-attribute continuous color domain portion 230, it may display multiple attributes derived from the same seismic cube or different seismic cubes, for example, by processing the multiple attributes using a continuous color domain. In the multi-attribute continuous color domain 230, as an example, two data sets may be processed using a continuous color domain to arrive at a sharpened multicolor image. In such an example, a first data set may correspond to a first attribute and a second data set may correspond to a second attribute where, for example, the first and second attributes are derived from the same seismic data cube. As an example, the first and second attributes may be derived using the same attribute algorithm operating on different data within the same seismic data cube (e.g., slices at different depths) or, for example, they may be derived using different attribute algorithms operating on the same data within the same seismic data cube (e.g., the same slice).

In the example of FIG. 2, the attribute block 220 may provide for extraction of multiple attributes (e.g., 1, 2, . . . N) from a seismic cube or seismic cubes (e.g., using commercially available software, custom software, etc.). One or more of such attributes may include, for example, signal properties such as amplitude and frequency, structural properties such as curvature and gradient or statistical properties such as variance. As an example, one or more enhancement techniques may be applied to one or more of the attributes (e.g., to optimize further processing, analysis, interpretation, etc.).

In the example of FIG. 2, the attribute block 220 is shown as providing three attributes: A1, A2 and A3 (e.g., three data sets). As an example, two attributes may be provided rather than three. As indicated by a merge block 240 of the multi-attribute continuous color domain portion 230, the three attributes A1, A2 and A3 may be selected and allocated to the red, green and blue bands in a continuous color RGB representation (e.g., an RGB image). Such an approach can extend the dynamic range of the data to the third power of the resolution of each attribute. Where two attributes are provided (e.g., two data sets), another continuous color representation may be used, for example, RG, RB, or GB (e.g., noting that a differential of two colors may be used).

As an example, a method such as the method 200 may be applied to N-dimensional data, for example, where N is at least two, may be three and may be greater than three (e.g., consider a space defined by six axes). In particular, while RGB are mentioned, and variations thereof, RGB may represent a first three coordinate axes while one or more additional coordinate axes are introduced to define a space. Where a space has dimensionality N (e.g., RG, RB, GB, RGB, ABCD, etc.), the various blocks in the method 200 may be suitable adapted to accommodate increased dimensionality, which may include providing N data sets (e.g., from a single cube, a single source, multiple cubes, multiple sources, etc.) and processing the data sets with N-dimensionality.

In an image processing block 250, image processing may be applied to the continuous color RGB representation of the multi-attribute data (e.g., the RGB image); noting that the increase in dynamic range can be beneficial for purposes of such image processing.

In the example of FIG. 2, the RGB image can code physical properties such as, for example, frequency, amplitude or velocity as color shades; noting that structural information may be included in boundaries between areas of different color and amplitude. As shown in the example of FIG. 2, a conversion block 260 provides for converting the RGB image from its RGB color model to a HSV color model, for example, to separate pure color information in the hue band from the color independent intensity information in the saturation band.

As indicated in the example of FIG. 2, a HSV image block 262 may include an H band (hue), a V band (value) and an S band (saturation); where, for example, a frequency and/or velocity block 264 may operate on the H band data, a signal strength block 266 may operate on the V band data, and a structural lineament block 270 may operate on the S band data. For example, the blocks 264, 266 and 270 may provide for rendering of each band to a display. In such an example, one or more graphical user interface controls may allow a user to adjust one or more parameters, etc., for example, for purposes of interpreting information included in each of the bands.

In the example of FIG. 2, the method 200 includes an edge detection block 280 for applying one or more algorithms to the S band data of the HSV image 262. As an example, a filter process, such as the Sobel method for example, may be applied to the S band data to detect one or more edges. The Sobel method may apply a filter for one dimension and a filter for another dimension where the results of the filtering are combined. The Sobel method may include applying a discrete differentiation operator for computing an approximation of the gradient of an image intensity function. In such an example, at each point in an input image, the result of the operator can be either the corresponding gradient vector or the norm of this vector. As an example, for a 2D image, a Sobel method may apply two weighting matrices (e.g., n×m kernels), one for each dimension of the 2D image (one for an n dimension and one for an m dimension), where intensity values of the 2D image are used within the matrices, around each image point, to approximate a corresponding image gradient for that image point (e.g., via a gradient value for each dimension, a gradient magnitude, a gradient direction, etc.).

As to edge detection, any of a variety of algorithms may be applied, for example, depending on source of data, attributes, etc. As an example, the MATLAB® computing environment includes various algorithms for finding edges in grayscale images (e.g., Sobel, Prewitt, Roberts, Laplacian of Gaussian, zero-cross, and Canny), which may optionally be applied to S band data.

As shown in the example of FIG. 2, the method 200 includes a structure sharpened RGB image block 290, which may be, for example, based on the processed RGB image, the merged RGB image, edge detection enhanced S band data, or other S band data. For example, the block 290 may include convolving the image processed RGB image of the image processing block 250 and edge detection enhanced S band data of the edge detection block 280.

As an example, a structure sharpened RGB image of the block 290 may represent geological character of an area of investigation more realistically than would a description given by a single attribute by itself. As shown in the example of FIG. 2, an inverse block 292 may provide for an inverse RGB process, for example, to generate one or more sharpened attributes per a sharpened attribute block 294. As an example, a method can include an inverse transformation (e.g., per block 292) that decomposes an image such as, for example, a sharpened RGB image as in block 290, into sharpened attribute images of the shape and configuration of block 220 (e.g., per block 294). As an example, an inverse transform may include transforming from an RGB domain back to a time domain (e.g., original time domain), a depth domain (e.g., original depth domain), etc.

As an example, a result, e.g., an intermediate result, a final result, etc., may be interpreted, for example, for one or more structures, at a selected individual stage, at selected stages, etc., of a method such as the method 200. For example, the method 200 may include one or more conditional blocks, decision blocks, etc., optionally programmable in a workflow, where a result may be subject to an interpretation. In turn, an option may exist for altering one or more actions (e.g., stages, blocks, etc.) and optionally for returning to an earlier action (e.g., to fine-tune an image or images for purposes of interpretation). As an example, interpretation of data during the execution of the method 200 may be carried out at one or more stages. For example, geobody extraction may be useful on an RGB cube of block 240, on a structural lineament cube of block 270, on a SAMP cube (see, e.g., image 1350 of FIG. 13), on a marbleize cube (see, e.g., image 1540 of FIG. 15), etc.

As an example, the method 200 may optionally be implemented, wholly or in part, as a workflow for structurally sharpened multi-attribute analysis in continuous color RGB. As an example, a structure-sharpened continuous color image may be referred to as an SRGB image, for example, whether it is based on RGB or another continuous color scheme. As an example, an SRGB attribute may refer to a method such as the method 200 of FIG. 2 where two or more data sets are processed to arrive at an SRGB image. As an example, the method 200 of FIG. 2 may be referred to as an SRGB attribute process.

As an example, a method such as the method 200 may include various options as to sampling of data, for example, for purposes of input to a continuous space domain process or processes (e.g., one or more of the blocks of the multi-attribute continuous color domain 230). As an example, an SRGB plug-in may be provided that includes one or more "depth-gapping" defaults, options, etc., which may include, for example: (i) default as one sample up, one sample down; (ii) variable depth gaps as "M" samples up, "N" samples down; (iii) variable depth gaps as R, G, and B depth/time extraction levels specified by surfaces. As an example, such a plug-in may include one or more blocks of the method 200 coupled to one or more blocks of the method 200, etc. For example, a graphical user interface (GUI) may include an option to access an SRGB plug-in (e.g., in a framework such as the framework 170 of FIG. 1) and to use the plug-in to perform one or more depth-gapping defaults, options, etc. for purposes of one or more actions of the method 200. As an example, a workflow editor may be provided to create, edit, save, etc., a workflow that may include one or more worksteps corresponding to one or more of the actions of the method 200, one or more related actions, etc.

As an example, data may include time slice data, depth slice data, horizon data, data flattened on horizons, etc. As an example, multiple data sets may be generated from time-gap or depth gap SRGB, top-to-down or lateral direction, guided by horizons or well trajectories, etc.

As an example, data may include data from at least two data sets transformed and processed in a continuous color model (e.g., an N-dimensional continuous space model). As an example, data enhancement may occur via edge detection on saturation data. As an example, data may include geophysical data, seismic data, satellite data, etc. As an example, data may include time slice or frequency attribute data. As an example, data may be selected to attenuate noise. As an example, a method may include saturation sharpening of data. As an example, a method may include extraction of lineaments, curved features, etc.

FIG. 2 also shows an example of a system 201 that includes one or more computers 202, one or more storage devices 205, one or more networks 206 and one or more modules 207. As to the one or more computers 202, each computer may include one or more processors (e.g., or processing cores) 203 and memory 204 for storing instructions (e.g., modules), for example, executable by at least one of the one or more processors. As an example, a computer may include one or more network interfaces (e.g., wired or wireless), one or more graphics cards, a display interface (e.g., wired or wireless), etc. As an example, data may be provided in the storage device(s) 205 where the computer(s) 202 may access the data via the network(s) 206 and process the data via the module(s) 207, for example, as stored in the memory 204 and executed by the processor(s) 203. As an example, the one or more modules 207 may include one or more modules corresponding to one or more of the blocks of the method 200 (e.g., as code to instruct a processor to perform an action or actions). As an example, the one or more modules 207 may be configured as a plug-in, for example, to plug into the framework 170 of the system 100 of FIG. 1.

FIG. 3 shows an example of a method 300 along with an example of an RGB color model 302 and a HSV color model 304 (e.g., where colors are represented by their first letter). In the example of FIG. 3, data 322, 324 and 326 are provided from one or more sources. In turn, the data 322, 324 and 326 are assigned to axes 332, 334 and 336 of the RGB color model 302 to provide a continuous RGB color model representation of the data 322, 324 and 326. As shown, a transformation block 350 can transform the continuous RGB color model representation of the data 322, 324 and 326 as H band data 362, V band data 364 and/or S band data for HSV bands of the HSV color model 304. As an example, an algorithm that provides for conversion of RGB data to HSV data may be implemented, optionally with zero filling, etc., for example, where less than three sets of data are provided (e.g., two of data 322, 324 and 326). As an example, the transformation block 350 may optionally provide for S band data only.

Figure 4:
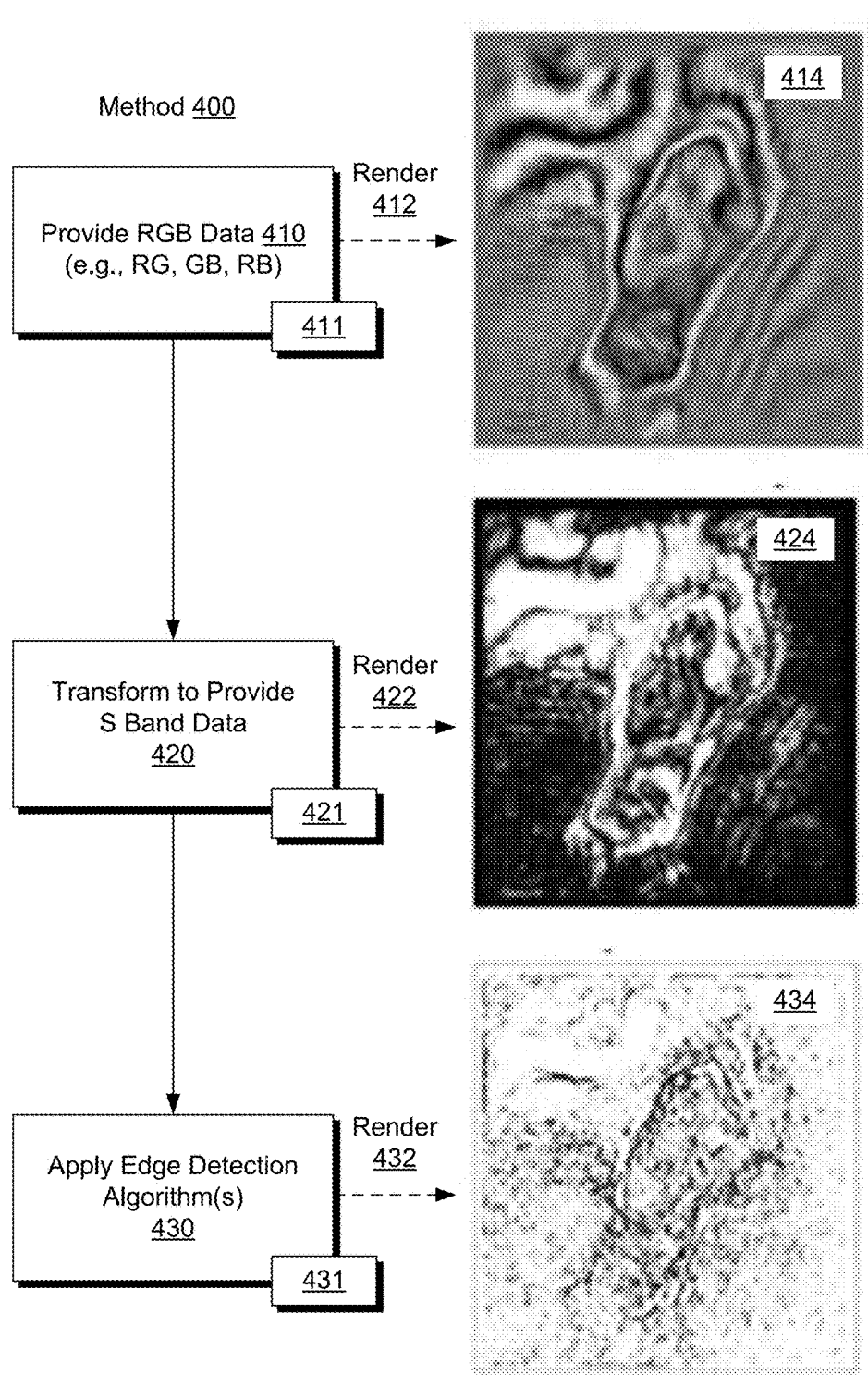
FIG. 4 illustrates an example of a method for transforming data and for applying one or more edge detection algorithms.

FIG. 4 shows an example of a method 400 that includes a provision block 410 for providing RGB data, a transform block 420 for transforming RGB data to provide S band data, and an application block 430 for applying one or more edge detection algorithms to the S band data. In the example of FIG. 4, images 414, 424 and 434 are shown in grayscale; noting that the image 414 may be a color image (e.g., RGB, RG, GB, RB, etc.). As shown, the image 424 is an S band data image while the image 434 is an image of data resulting from application of one or more edge detection algorithms to the S band data. Accordingly, the method 400 can provide for extracting edge information from RGB data that includes data for at least two data sets (e.g., two attributes).

Also shown in FIG. 4 are dashed arrows indicating that the method 400 may include rendering of one or more images of data to a display. For example, the method 400 may include rendering 412 to render at least a portion of the provided RGB data to a display, rendering 422 to render at least a portion of the S band data to a display, and rendering 432 to render at least a portion of the enhanced data to a display.

The method 400 is shown in FIG. 4 in association with various computer-readable media (CRM) blocks 411, 421 and 431. Such blocks generally include instructions suitable for execution by one or more processors (or processor cores) to instruct a computing device or system to perform one or more actions. While various blocks are shown, a single medium may be configured with instructions to allow for, at least in part, performance of various actions of the method 400. As an example, a computer-readable medium (CRM) may be a computer-readable storage medium.

As an example, a computing device or system may include display memory, optionally associated with a GPU, for purposes of rendering data to a display or displays. As an example, a GPU may provide one or more algorithms, for example, to access data, to transform data, to enhance data, etc. For example, a GPU may include an algorithm for transforming data from an RGB color model to a HSV color model. Such a GPU may include an algorithm for enhancing saturation data, for example, via application of one or more edge detection algorithms.

Figure 5:
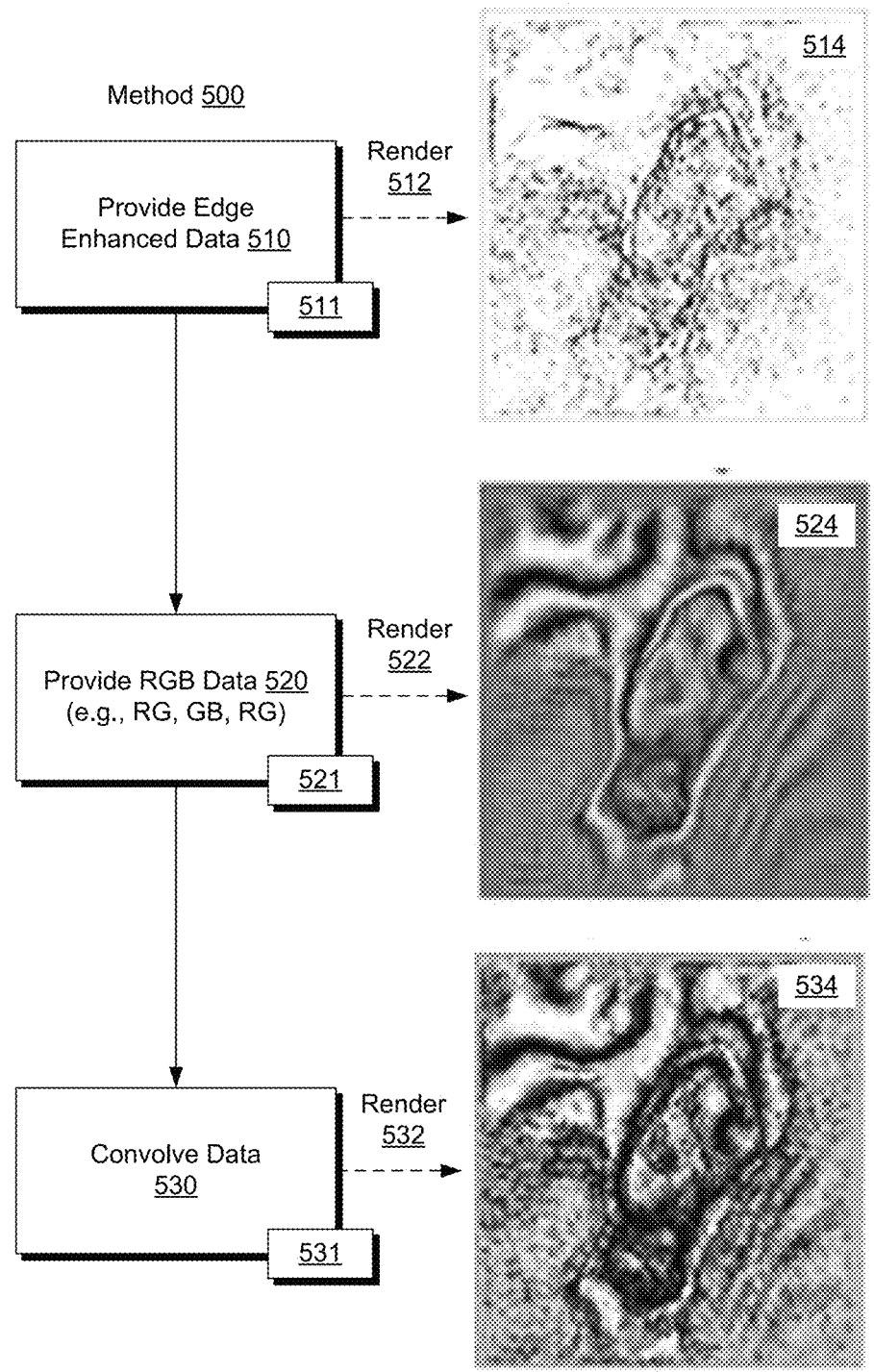
FIG. 5 illustrates an example of a method for convolving edge enhanced data and other data.

FIG. 5 shows an example of a method 500 that includes a provision block 510 for providing edge enhanced data (see, e.g., the block 430 of the method 400 of FIG. 4), a provision block 520 for providing RGB data (see, e.g., the block 410 of the method 400 of FIG. 4), and a convolution block 530 for convolving the provided edge enhanced data and the provided RGB data. In the example of FIG. 5, images 514, 524 and 534 are shown in grayscale; noting that the images 524 and 534 may be color images (e.g., RGB, RG, GB, RB, etc.). As shown, the image 514 is an image of data resulting from application of one or more edge detection algorithms (e.g., to S band data) while the image 534 is based at least in part on such data to enhance information in the RGB image 524, for example, for purposes of interpretation, analysis, etc.

Also shown in FIG. 5 are dashed arrows indicating that the method 500 may include rendering of one or more images of data to a display. For example, the method 500 may include rendering 512 to render at least a portion of the enhanced data to a display, rendering 522 to render at least a portion of the RGB data to a display, and rendering 532 to render at least a portion of the convolved data to a display.

The method 500 is shown in FIG. 5 in association with various computer-readable media (CRM) blocks 511, 521 and 531. Such blocks generally include instructions suitable for execution by one or more processors (or processor cores) to instruct a computing device or system to perform one or more actions. While various blocks are shown, a single medium may be configured with instructions to allow for, at least in part, performance of various actions of the method 500. As an example, a computer-readable medium (CRM) may be a computer-readable storage medium.

As an example, a computing device or system may include display memory, optionally associated with a GPU, for purposes of rendering data to a display or displays. As an example, a GPU may provide one or more algorithms, for example, to access data, to transform data, to enhance data, etc. For example, a GPU may include an algorithm for transforming data from an RGB color model to a HSV color model. Such a GPU may include an algorithm for enhancing saturation data, for example, via application of one or more edge detection algorithms. Such a GPU may include an algorithm for convolving data, for example, to generate convolved data suitable for rendering to a display.

Figure 6:
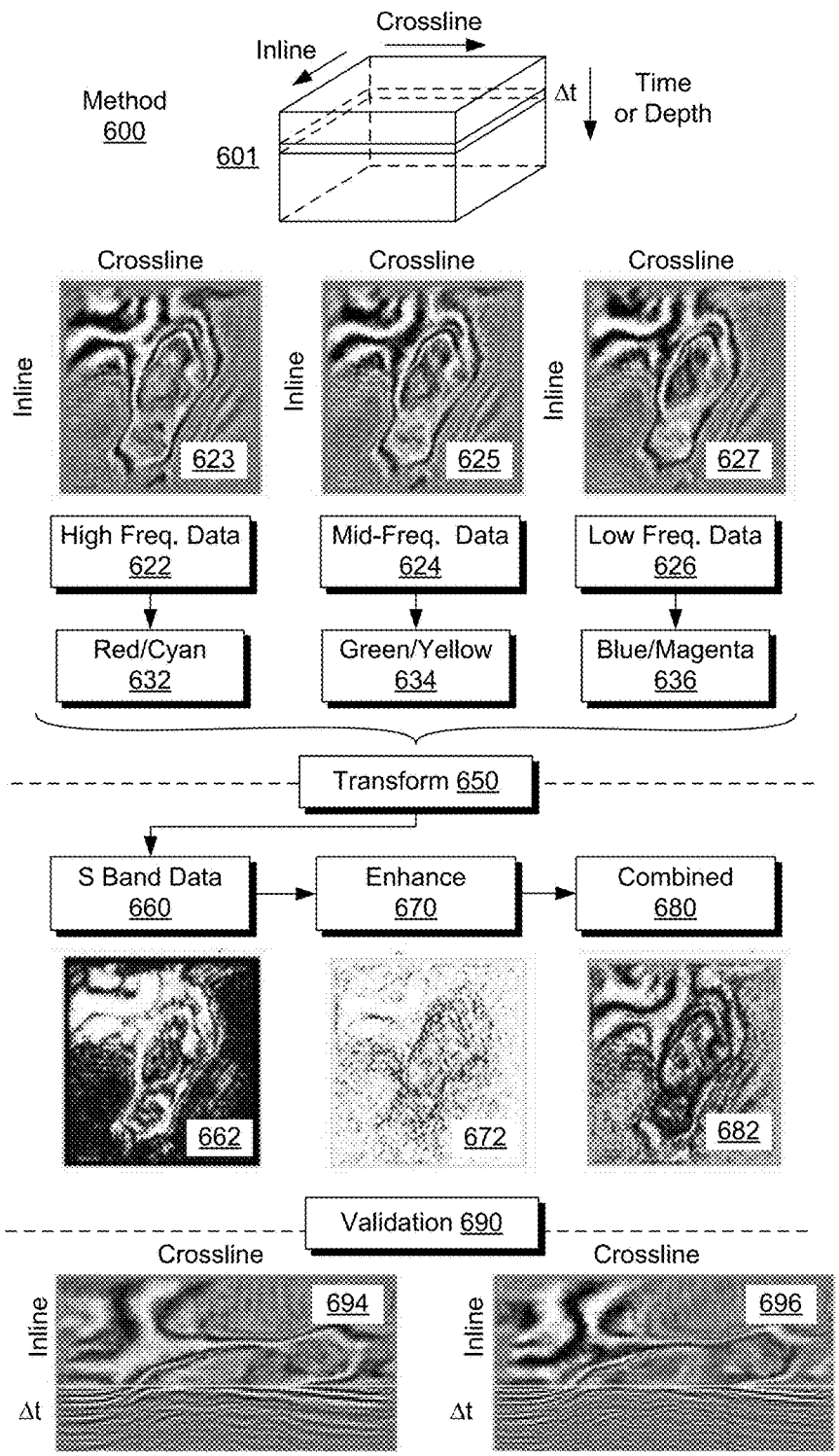
FIG. 6 illustrates an example of a method for processing seismic data and optionally validating transformed data.

FIG. 6 shows an example of a method 600 with respect to a data "cube" 601 defined with respect to crossline, inline and time or depth dimensions. In the example of FIG. 6, data for a time slice "At" (or depth slice) of the cube are processed to provide high frequency data 622, mid-frequency data 624 and low frequency data 626. The data 622, 624 and 626 are then assigned to axes 632, 634 and 636 of a continuous RGB color model. A transform block 650 applies a transform to the data in the continuous RGB color model to provide at least S band data 660. An enhancement block 670 may be implemented to enhance the S band data 660 and a combination block 680 may be implemented to combine the enhanced S band data (e.g., or the S band data) and other data, which may be, for example, the high frequency data 622, the mid-frequency data 624, the low frequency data 626, unprocessed data of the time slice, other processed data of the time slice, etc.

As an example, a time slice of seismic data from an erosional structure was selected and bandpass filtering was applied to generate nine bands, each having an approximately 10 Hz bandwidth. Of the nine bands, three were selected: one high frequency (approximately 60 Hz), one mid-frequency (approximately 30 Hz) and one low frequency (approximately 10 Hz). The grayscale images 623, 625 and 627 represent each of these bands, which may be considered as input attributes.

As indicated in the example of FIG. 6, the high frequency data 622 was allocated to red/cyan, the mid-frequency data 624 was allocated to green/yellow and the low frequency data 626 was allocated to blue/magenta, for example, to form a continuous color RGB image that combines the characteristics of the three input attributes in one RGB image.

While the transform 650 of FIG. 6 provides for S band data 660, it may also provide for H band data, V band data or both H band data and V band data. As an example, for a continuous color RGB image transformed to a HSV color model specification, H band data (see, e.g., H in the HSV color model 304 of FIG. 3) can represent color information; whereas, S band data can represent color-independent intensity information. In the example of FIG. 6, a grayscale image 662 is S band data and a grayscale image 672 is based on the S band data, for example, by running an edge detection algorithm on the S band data.

In FIG. 6, the image 672 includes various contours that represent structural lineaments contained in the single time slice data (see, e.g., the time slice Δt in the seismic data cube 601). More particularly, a portion of the contours correspond to an elongated structure that represents a subcrop boundary around an eroded anticlinal structure. These are seen more clearly in a combined image 682, which is a result of a convolution process applied to data of the enhanced image 672 and the continuous color RGB image (e.g., the high, mid- and low frequency data assigned to the axes 632, 634, and 636). The image 682 resulting from the combination process for the data is a structure sharpened RGB image, which reveals the spectral structure of the seismic data within the time slice Δt (e.g., based on the three frequency attributes).

As an example, a validation process 690 may be applied to validate a result or results from a method that includes a transform of data (e.g., attributes in a continuous RGB color model) to a HSV color model. For example, in FIG. 6, the validation process 690 may be applied by extracting the time slice (Δt) and a corresponding section from the seismic cube 601. As shown in FIG. 6, extracted data 694 are plotted adjacent to each other such that the bottom of the time slice fits the top of the section. In the example of FIG. 6, the validation process 690 demonstrates that the section includes an anticlinal structure, the top of which is eroded; and, on both flanks of the anticline, flat continuous layers dip away from the anticline.

Data 696 are also shown in FIG. 6, as amplitude in grayscale, which may be compared against data 694 shown as an RGB image (e.g., as created from data for the three frequencies). The data 694 shown as the RGB image provides more details in both the time slice and the section when compared to the data 696 shown as the grayscale image.

As an example, a method may include processing data of a seismic cube to provide a spatial variance attribute, for example, to highlight areas of lateral change in the seismic cube, which may reveal sudden vertical changes. Referring to the example of FIG. 6, such a method may include extracting spatial variance attributes for the high, mid and low frequency data, assigning data to axes of a continuous RGB color model and transforming the data to provide S band data. Given the S band data, one or more algorithms may be applied to enhance the data (e.g., to provide enhanced data) and, optionally, the S band data, the enhanced data, may be combined with other data such as data represented by an RGB image to provide a structurally sharpened RGB image for the spatial variance (e.g., of the time slide, depth slice, section, etc.).

For the spatial variance example, a validation process may include extracting three seismic horizons from the seismic cube, for example, one above an erosional discontinuity horizon (e.g., assigned to blue), one on that horizon (e.g., assigned to green) and one below that horizon (e.g., assigned to red). As an example, the results from the structural spatial variance attribute analysis may then be draped onto these horizons.

An analysis of data from structural sharpened attribute RGB images draped on a set of three horizons around an erosion horizon and correlation with conventional seismic inline and crossline sections was performed. The analysis included display of RMS amplitude in grayscale, structurally sharpened spectral amplitude in RGB and variance attribute in RGB (e.g., for three frequency bands). The analysis highlighted main axes of an anticline (e.g., NW-SE and SW-NE) below the erosion horizon. Further, on either flank of the anticlinal structure, flat layers pinching out towards the top of the anticline were highlighted.

FIG. 7 shows example images 710, 730 and 750. As an example, an analysis included grayscale coding of instantaneous amplitude (e.g., as a manner of coding and displaying seismic data). In such an example, for orientation, four crossline sections were inserted at lines where horizons were cut to reveal an outline of an anticline, however, without sufficient detail. To enhance detail, a sharpened spectral RGB image was rendered to a display using data from three frequency bands (e.g., 60, 30 and 10 Hz). The rendered sharpened spectral RGB image revealed a subcrop around the anticline, which results from the pinch-out of the layers on the flanks of the anticline (e.g., highlighted by a strong black signature). Within the anticline, structures were revealed in layers above and on the erosion horizon, whereas the horizon below the erosion did not reveal any noticeable structures. As indicated in the image 710 of FIG. 7, the sharpened spectral variance RGB data show a spatial distribution of variations in the 60, 30 and 10 Hz frequency bands, which map mainly to small scale structures and lineaments.

The example image 710 of FIG. 7 demonstrates how results of a structural sharpened RGB attribute analysis can highlight various features. In the example image 710, process data were draped over the horizons around the erosion horizon of the anticline and horizons were partially cut away from front to back to reveal the structural changes from layer to layer. As shown in the example image 710, the horizon below the erosion extends across the entire cube, the erosion horizon itself is cut away by about 50% and the remaining analysis surface is covered by the horizon above the erosion horizon (a green arrow indicates the direction to north).

Various arrows in the image 710 indicate some examples of small structures in the erosion horizon and below, which may correlate with fluvial channels. Sets of lineaments sub-parallel to the main anticlinal axis are also shown, for example, across the SE part of the anticline, which may represent local fault zones. A layer above the erosion horizon includes larger scale structures (e.g., as mapped by the sharpened spectral RGB image data).

As an example, a method can include spectral attribute analysis (e.g., amplitudes, spatial variance, etc.) for structural mapping of geological structures. For example, instantaneous amplitude (e.g., spectral sum of amplitudes of individual frequencies) by itself might not reveal subtle structures because of interference of the individual frequency bands. However, merging different spectral attributes in an RGB image approach can provide continuous color coding of the spectral attribute values over an expanded dynamic range. In such an approach, subtle frequency changes may be mapped as color changes and used to distinguish small-scale structural and sedimentary features.

The example images 730 and 750 of FIG. 7 demonstrate how structural detail can be enhanced through use of spectral attributes, for example, by comparing the image 730 for an instantaneous amplitude attribute to the image 750 for spectral attributes, as processed using a continuous RGB color model and transformation to an S band of a HSV color model to enhance structural features. As demonstrated by the example images 730 and 750, a method that includes extraction of spectral attributes from seismic data and representation in continuous colors reveals structures that may not appear via instantaneous amplitude processing. The extraction of structural lineaments from an "HSV attribute" cube can further enhance structural delineation by seismic data. As demonstrated, spectral RGB analysis of amplitude data may reveal larger structures, the internal structure of which may be mapped using spectral variance RGB analysis. The combination of these complementary data sets may provide a detailed structural insight for multiple scales (e.g., structure size scales).

As an example, a method can include providing data from at least two data sets in a continuous color model that includes at least two color axes; transforming the data from the continuous color model to a hue, saturation and value color model to generate at least saturation data; applying an edge detection algorithm to the saturation data to generate enhanced data; and rendering at least a portion of the enhanced data to a display. In such an example, the continuous color model may be RGB color model (e.g., RGB, RG, GB, RB, etc.). As an example, data may include geophysical data, for example, consider seismic data. As an example, data may include satellite imagery data. As an example, data may include data from at least two different sources (e.g., seismic data, imagery data, etc.).

As an example, a method may include processing of data from at least two data sets (e.g., consider a satellite imagery data set and a seismic data set).

As an example, a method may include convolving at least a portion of data in a continuous color model with at least a portion of enhanced data, as enhanced saturation data. As an example, a method may include convolving at least a portion of data in a continuous color model with at least a portion of a saturation data (e.g., based on a transformation of the data in the continuous color model to a HSV color model).

As an example, a method can include providing data in a continuous color model for at least two data sets where, for example, one data set is for a first attribute and another data set is for a second attribute. In such an example, the first attribute and the second attribute may be frequency attributes.

As an example, a first attribute and a second attribute may be attributes derived from time slice data of a seismic cube. As an example, a first attribute and a second attribute may be selected to attenuate noise (e.g., in seismic data).

As an example, a system can include one or more processors for processing information; memory operatively coupled to the one or more processors; and modules that include instructions stored in the memory and executable by at least one of the one or more processors, where the modules include: a continuous color model module for providing data from at least two data sets in a continuous color model that includes at least two color axes; a transformation module for transforming the data from the continuous color model to a hue, saturation and value color model to generate at least saturation data; and an application module for applying an edge detection algorithm to the saturation data to generate enhanced data. As an example, such a system may include a convolution module for convolving at least a portion of the data in the continuous color model with at least a portion of the enhanced data. As an example, a system may include a convolution module for convolving at least a portion of data in a continuous color model with at least a portion of saturation data (e.g., where the saturation data is generated by transforming the data in the continuous color model).

As an example, a system can include an attribute selection module for selecting an attribute to provide one or more data sets. As an example, the attribute selection module may provide for selection of one or more seismic attributes. For example, a selection module may provide for selection of data and an attribute where an algorithm processes the data to provide the attribute (e.g., as attribute data).

FIG. 8 shows examples of workflows 800 that may include transforming data to an S band, for example, of a HSV color model. As shown, the workflows 800 include sharpened RGB-based workflows 810, data conditioning and/or processing workflows 830 and lithology and/or structural workflows 850.

Various workflows may include attribute processing features, for example, as available through the PETREL® software. For example, the PETREL® software includes a structural attributes library that includes a collection of algorithms that may be applied to data, for example, to isolate, enhance, etc. structural variations in seismic reflection patterns. Algorithms may include, for example, dip deviation algorithms, local structural azimuth algorithms, structural smoothing algorithms, variance algorithms, ant tracking algorithms, and gradient magnitude algorithms.

As an example, a continuous color domain processing technique can generate outputs, for example, where one output is referred to as a structural cube or "STRUCT" attribute and another output is referred to as a cube of STRUCT sharpened RGB voxels or SRGB attribute (see, e.g., the structure sharpened RGB image block 290 of FIG. 2, which, as mentioned, may be an SRGB attribute). As an example, various workflows may include use of the STRUCT and SRGB attributes, for example, for data analysis, enhanced extraction of structural information from seismic data cubes, etc. FIG. 8 shows some examples of workflows 800 that may include providing or generating a STRUCT attribute, providing an SRGB attribute, etc.

In the example of FIG. 8, the sharpened RGB-based workflows 810 include guided extraction of structure and/or texture workflows 812, discrimination through texture workflows 814 and integration of structural data workflows 816. As an example, the workflows 812 can include geology and stratigraphy guided extraction of geological structures and texture using stratigraphic information and legacy well data to characterize the geological setting of an area under investigation. As an example, the workflows 814 can include discrimination of rocks through textural characterization (e.g., determination of rock reaction on stress). As an example, the workflows 816 can include seamless integration of structural data volumes obtained from STRUCT-based structural analysis of data cubes from measurements of different geophysical properties.

In the example of FIG. 8, the data conditioning and/or processing workflows 830 include sharpening workflows 832, tracking workflows 834 and marbleizing workflows 836. As an example, the sharpening workflows 832 can include a structural sharpening of seismic attribute cubes with STRUCT for improved horizon picking and geobody delineation, which may be referred to as a "SAMP" technique (e.g., structure enhanced amplitude). As an example, the tracking workflows 834 can include the ant tracking on the STRUCT attribute, referred to as an "ANT(STRUCT)" technique, for extraction of structural information. As an example, the marbleizing workflows 836 can include structural sharpening of seismic attribute cubes by merging cubes from ANT(STRUCT) and AMP (e.g., amplitude data or SAMP, etc.) into a cube that provides both horizons from seismic reflections as well as texture from SRGB structural extraction. As an example, such a technique may be referred to as a "MARBELIZE" technique.

In the example of FIG. 8, the lithology and/or structural workflows 850 can include sharpening salt workflows 852, SRGB-based map of salt texture and/or stress workflows 854, extraction of intra-salt workflows 856, fracture extraction workflows 858, dissolution features workflows 862, discrimination of brittle rock(s) workflows 864, and mapping of folds and/or faults workflows 866. As an example, the sharpening salt workflows 852 can include sharpening of salt boundaries for improved delineation of salt bodies. As an example, the SRGB-based map workflows 854 can include SRGB-based mapping of top salt texture and stress pattern. As an example, the extraction of intra-salt workflows 856 can include extraction of intra-salt structures ("dirty salt"). As an example, the fracture extraction workflows 858 can include extraction of fracture networks in brittle fractured limestone using ant tracking of the STRUCT attribute. As an example, the dissolution features workflows 862 can include delineation of dissolution features in carbonates and evaporates (e.g., karsting), for example, using depth gap or spectral SRGB. As an example, the discrimination of brittle rock(s) workflows 864 can include discrimination of brittle rocks, for example, which react competently to stress by cracking (e.g., from incompetent rocks releasing stress through plastic deformation). As an example, the mapping folds and/or faults workflows 866 can include structural mapping in the presence of folded and faulted structures (e.g., where large scale structures such as anticlines, folds and faults may be removed by flattening prior to application of an SRGB technique).

As an example, a workflow may include accessing seismic data, accessing non-seismic data, and accessing both seismic data and accessing non-seismic data. As mentioned, non-seismic data may include data such as satellite imagery data.

As an example, a workflow may include conditioning of data and processing that may optionally be adapted to a geological setting of the area (e.g., to structural, lithological and depositional environment of an area and interval under investigation). As an example, ant tracking of an attribute may provide for highlighting curved features—karst holes in limestone—and effects of caustics, which may result in a tangential approximation of karst holes by ant tracks. Such an effect may possibly have been avoided if information about karsting of the limestone had been available prior to the attribute processing.

As an example, an SRGB technique may be extended to inclusion of the STRUCT attribute into a workflow for structurally sharpening a data cube. For example, a structural cube for an SRGB attribute may be multiplied with its original input data cube. In such an example, sharpening can act to reduce amplitude of multiples for a salt data set, which may be evident for data with strong impedance contrast horizons as for salt and clastic sediments.

As an example, for data with lower impedance contrast horizons, a workflow may include merging structure and input data to provide a result in which horizons are highlighted from seismic reflections and fine structures are highlighted from ant tracking of a STRUCT attribute. Such an example may be referred to as "marbleizing," because a resulting image resembles a design technique that produces an artificial marble texture.

Figure 9:
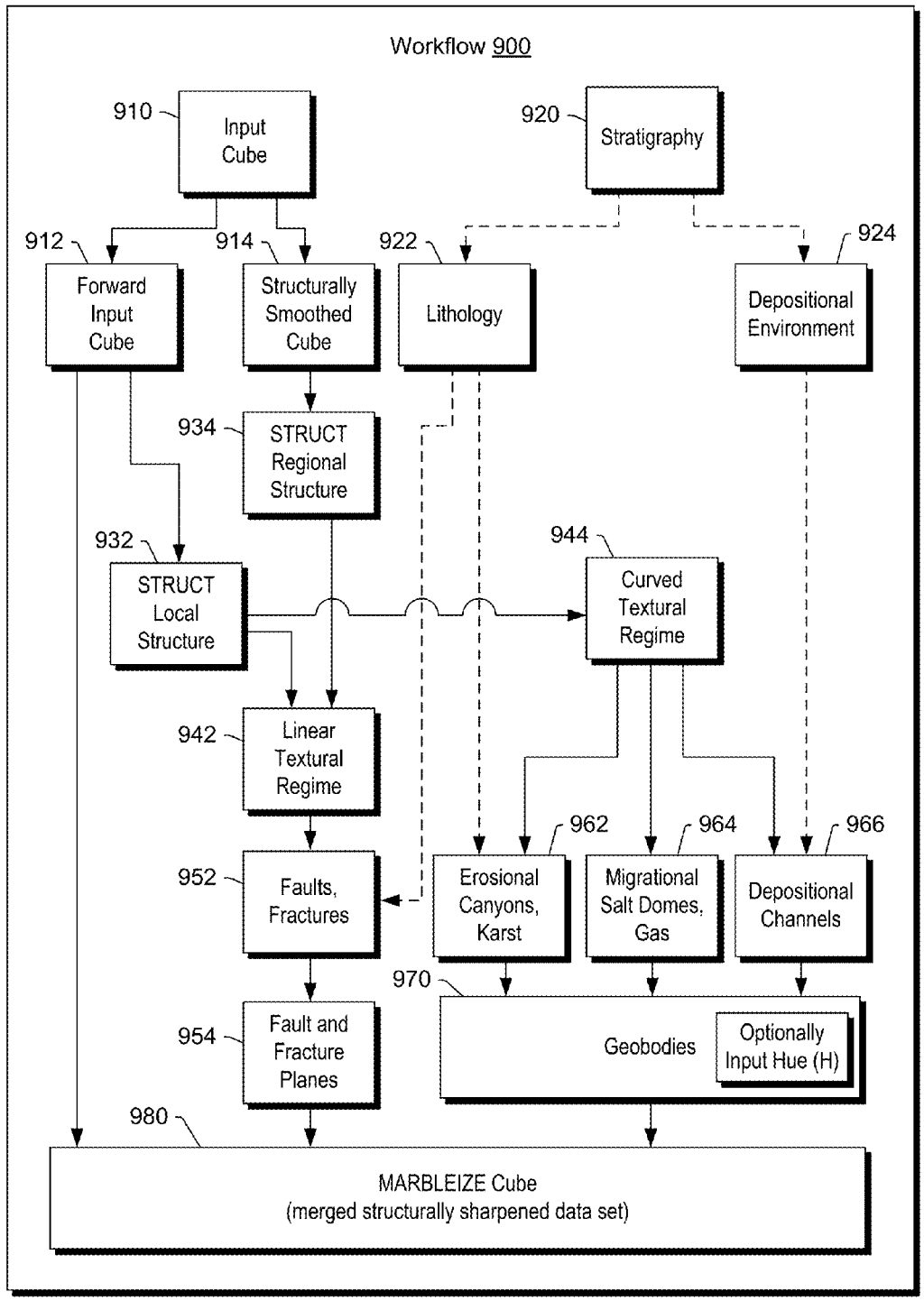
FIG. 9 illustrates an example of a workflow or method.

FIG. 9 shows an example of a workflow 900 (e.g., a method) to generate a marbleized cube, for example, as a set of data defined with respect to three-dimensions that may be rendered to a display to illustrate a marbleizing effect that may enhance interpretation, further processing, etc.

In the example of FIG. 9, the workflow 900 includes an input block 910 for input of a data cube. As shown, a forward block 912 may forward the input data cube for further processing while a processing block 914 acts to structurally smooth the data in the input data cube. One STRUCT block 932 provides for processing the forwarded input data cube to generate a STRUCT attribute for purposes of highlighting local structure while another STRUCT block 934 provides for processing the structurally smoothed data to generate a STRUCT attribute for purposes of highlighting regional structure. As indicated, the two STRUCT attributes of the STRUCT blocks 932 and 934 may be passed to a linear textural regime block 942 that provides for processing of the two STRUCT attributes for purposes of highlighting linear features. Further, the STRUCT attribute of the STRUCT block 932 may be passed to a curved textural regime block 944 that provides for processing of the STRUCT attribute for purposes of highlighting "curved" features.

In the example of FIG. 9, the workflow 900 can include providing stratigraphy information per a provision block 920. For example, the provision block 920 may provide lithology information 922, depositional environment information 924 or both lithology information 922 and depositional environment information 924. As indicated, the lithology information 922 may be input to a feature identification block 952 for identifying (e.g., highlighting) linear features such as faults and input to a feature identification block 962 for identifying features such as erosional canyons, karst, etc. As to the depositional environment information 924, it may be input to a feature identification block 966 for identifying features such as depositional channels.

Given various types of stratigraphic information, the workflow 900 can include processing to highlight fault and fracture planes per a block 954 and processing to highlight one or more geobodies per a block 970, which may include receipt of information from one or more identification blocks such as the block 962 and the block 966 as well as a block 964 for purposes of identifying migrational salt domes, gas, etc.

In the example of FIG. 9, the workflow 900 includes a marbleizing block 980 for marbleizing data, for example, based on inputs such as the forwarded input cube (e.g., per the block 912), the fault and fracture planes (e.g., per the block 954), and one or more geobodies (e.g., per the block 970).

As an example, the workflow 900 may be an SRGB-based workflow that includes structural RGB processing for purposes of extraction of structural features, for example, from tectonic processes—faults and fractures—as well as depositional and erosional features—channels and karst holes. As an example, such a workflow may be referred to as a stratigraphy-guided structural and textural workflow (see, e.g., the block 920). Such a workflow may aim to extract geological structures and texture, for example, which are integrated with geological and stratigraphic information. In such an example, information about lithology (see, e.g., block 922) and depositional environment (see, e.g., block 924) may provide guidance for attribute processing.

In the workflow 900 of FIG. 9, the various blocks may be provided as computer-readable media (CRM) blocks, for example, where such blocks include instructions suitable for execution by one or more processors (or processor cores) to instruct a computing device or system to perform one or more actions. While various blocks are shown, a single medium may be configured with instructions to allow for, at least in part, performance of various actions of the workflow 900. As an example, a computer-readable medium (CRM) may be a computer-readable storage medium.

As an example, one or more computer-readable storage media can include computer-executable instructions to instruct a computing system to: access data (see, e.g., the block 910); process the data to derive linear feature data (see, e.g., the block 942); process the data to derive curved feature data (see, e.g., the block 944); and combine at least a portion of the linear feature data and at least a portion of the curved feature data (see, e.g., the block 980).

As an example, one or more computer-readable storage media can include computer-executable instructions to instruct a computing system to access stratigraphic information for use in deriving linear feature data, curved feature data or linear feature data and curved feature data. For example, the workflow 900 of FIG. 9 includes the blocks 920, 922 and 924 as providing stratigraphic information, which may be used to identify linear features, curved features, etc.

As an example, one or more computer-readable storage media can include computer-executable instructions to instruct a computing system to output marbleized data based on a combination of at least a portion of linear feature data and at least a portion of curved feature data. For example, the workflow of FIG. 9 includes the block 980, which may output marbleized data.

Figure 10:
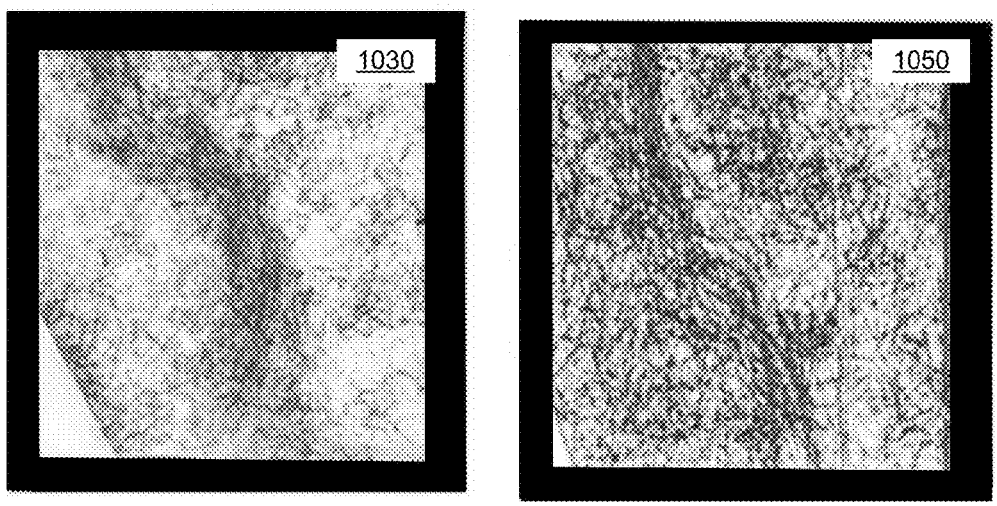
FIG. 10 illustrates an example of stratigraphic information and examples of images of data.

As an example, a stratigraphy-guided workflow can include classifying an analysis interval in geological—stratigraphic terms. For example, FIG. 10 shows information 1010 organized as a chart that includes a stratigraphic column for lithology and depositional environment. Given such information, a workflow may aim to distinguish linear dominated rock features (e.g., brittle fractures, faults, etc.) from curved dominated rock features (e.g., karst holes, channels, salt doming, folds, etc.). For example, such an approach may aim to account for a caustic response of ant tracking to curved structures (e.g., tangential approximation of curves by ant tracking).

As an example, given a goal of highlighting linear features, a workflow may include generating a structurally smoothed cube, for example, using the PETREL® software, other software, etc. (see, e.g., the block 914 of FIG. 9). In such an example, to extract large scale (e.g., regional structural regime), ant tracking may be implemented as curvature on such features for a given dimension (e.g., approximately 100 meters or more) may be considered to be "straight" enough. As an example, FIG. 10 shows two images 1030 and 1050 that illustrate a structural network from a structurally smoothed cube (see, e.g., block 914) and a high-resolution cube (see, e.g., block 912), respectively.

As an example, a workflow may include generating a structural cube in fine resolution, for example, for a linearly dominated environment (e.g., ANT(STRUCT) to deliver a fracture network) and for a curved dominated environment (e.g., ANT(STRUCT) may provide a fracture network for smooth features). As an example, in an alternative approach, H band data from an RGB to HSV transform may be used to fill a curved texture from the STRUCT attribute; for example, where the result may be passed to a geobody extraction process (see, e.g., the block 970 and "Optionally Input Hue (H)").

As to structural interpretation, a workflow may include processing for a linearly dominated environment (e.g., ANT (STRUCT) passed to an process for generation of fracture/fault statistics) and for processing a curved dominated environment (e.g., sum R, G, and B bands from SRGB, for example, to generate different amplitudes inside the curved structure and outside, where such data may be suitable for geobody extraction).

As an example, a workflow may include a merging process that acts to merge various data sets (see, e.g., marbleize block 980). In such an example, a merge process may project fractures and geobodies back into an original cube (e.g., optionally for validation, quality control, etc. with respect to the original data). As an example, a process may indicate one or more regions that could benefit from refinement or optimization (e.g., one or more horizons, geobodies may benefit from optimization).

Figure 11:
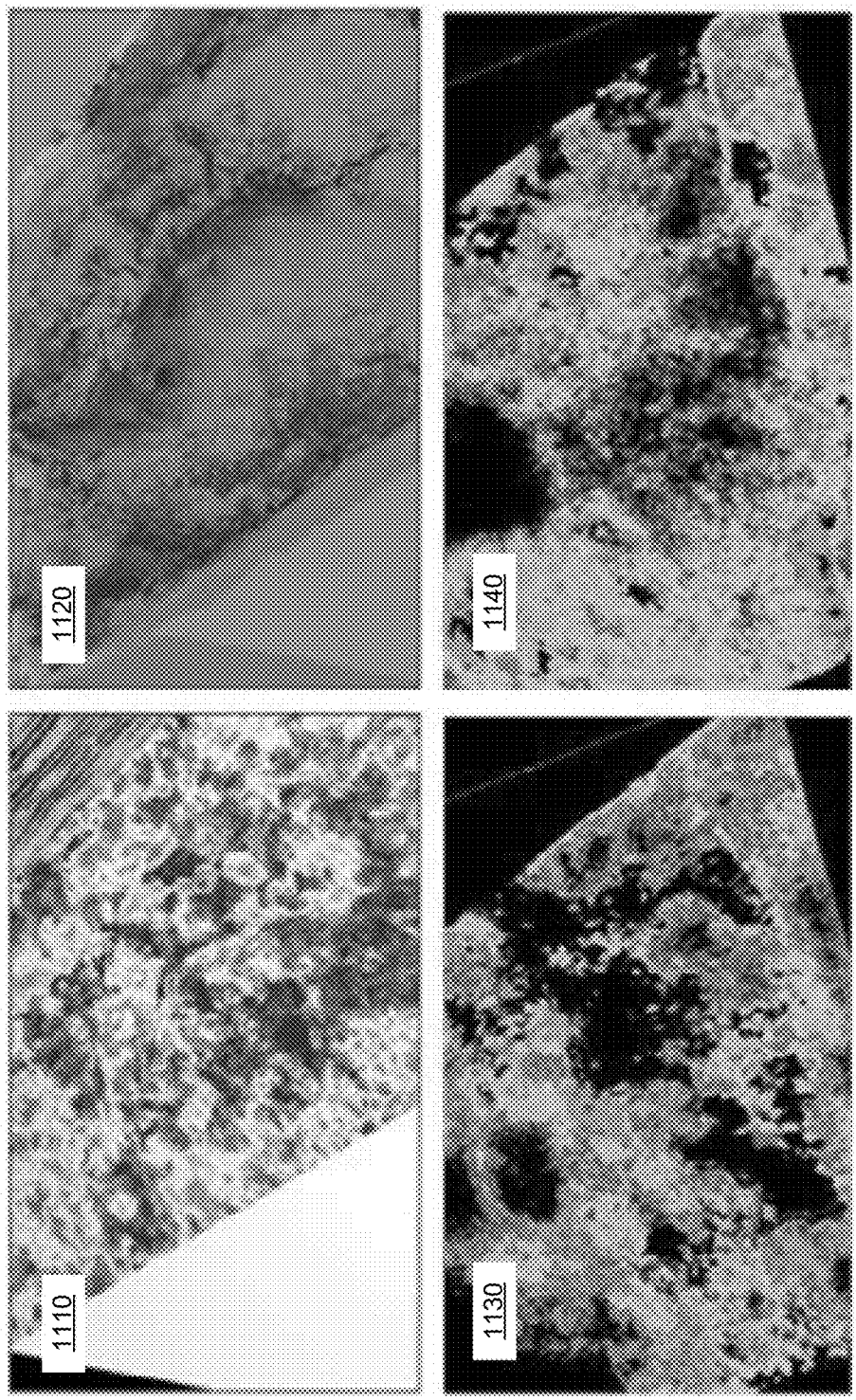
FIG. 11 illustrates examples of images of data associated with a workflow.

As an example, a workflow may provide for textural discrimination of rocks. For example, a workflow may aim at the discrimination of rocks through textural characterization (e.g., determination of rock reaction on stress). FIG. 11 shows various examples of images 1110, 1120, 1130 and 1140. The image 1110 is for a depth slice, the image 1120 is for a STRUCT sharpened amplitude (e.g., which may be referred to at times as SAMP), the image 1130 highlights plastic clastic sediment and the image 1140 highlights fractured limestone. In FIG. 11, the image 1110 does not suggest a change in rock type; however, the image 1120, which is constructed from the multiplication of the STRUCT attribute with the input data, does suggest a change in rock type.

As indicated, the STRUCT attribute is sensitive to subtle heterogeneities in the rock, for example, from fracture zones and fractures. The STRUCT attribute combination of the image 1120 reveals an S-shaped fracture zone running from top to bottom in the center of the data set. To the left of the fracture zone the rock shows denser heterogeneities indicating a denser fracture network than on the right. A geological validation process revealed that the fracture zone is a near-normal fault zone with a throw downwards in the left part of the data set. The fault offsets the rock package of a carbonatic shale overlying a pure shale such that in the depth slice the brittle carbonatic appears to the left of the fracture zone and the more plastic pure shale appears to its right (see, e.g., the images 1130 and 1140).

As an example, a workflow can include seamless integration through a STRUCT attribute (e.g., a STRUCT cube). For example, seamless integration of structural data volumes may be obtained from STRUCT-based structural analysis of data cubes from measurements of different geophysical properties. FIG. 12 shows an example of a method 1210 with respect to three data cubes from different measurements, which deliver information about different depth intervals. In the example of FIG. 12, the data may be stored as attribute cubes, for example amplitudes, in their respective physical property domain. In the method 1210, a STRUCT process 1220 extracts heterogeneities from the different cubes, which are subsequently merged by a merge process 1240 into a seamless STRUCT cube. In the example of FIG. 12, the resulting cube may be used for structural delineation, for structural sharpening of data sets, etc.

As an example, a process may be applied to different data sets, optionally from different sources. FIG. 12 also shows an image 1260 of a STRUCT attribute from satellite imagery data and an image 1280 of a STRUCT attribute from inverted surface wave data.

As an example, a workflow can include one or more data conditioning and processing techniques. For example, a STRUCT attribute may be used for conditioning of data prior to data processing and, for example, as well as in the data processing itself.

As an example, a SAMP technique may be implemented in a workflow. Such a technique may include structural sharpening of attribute cubes, for example, achieved by multiplication of a STRUCT attribute with an original attribute cube (e.g., optionally an amplitude cube). As an example, a sharpening process may aim to enhance events, for example, that delineate one or more geological structures.

Figure 13:
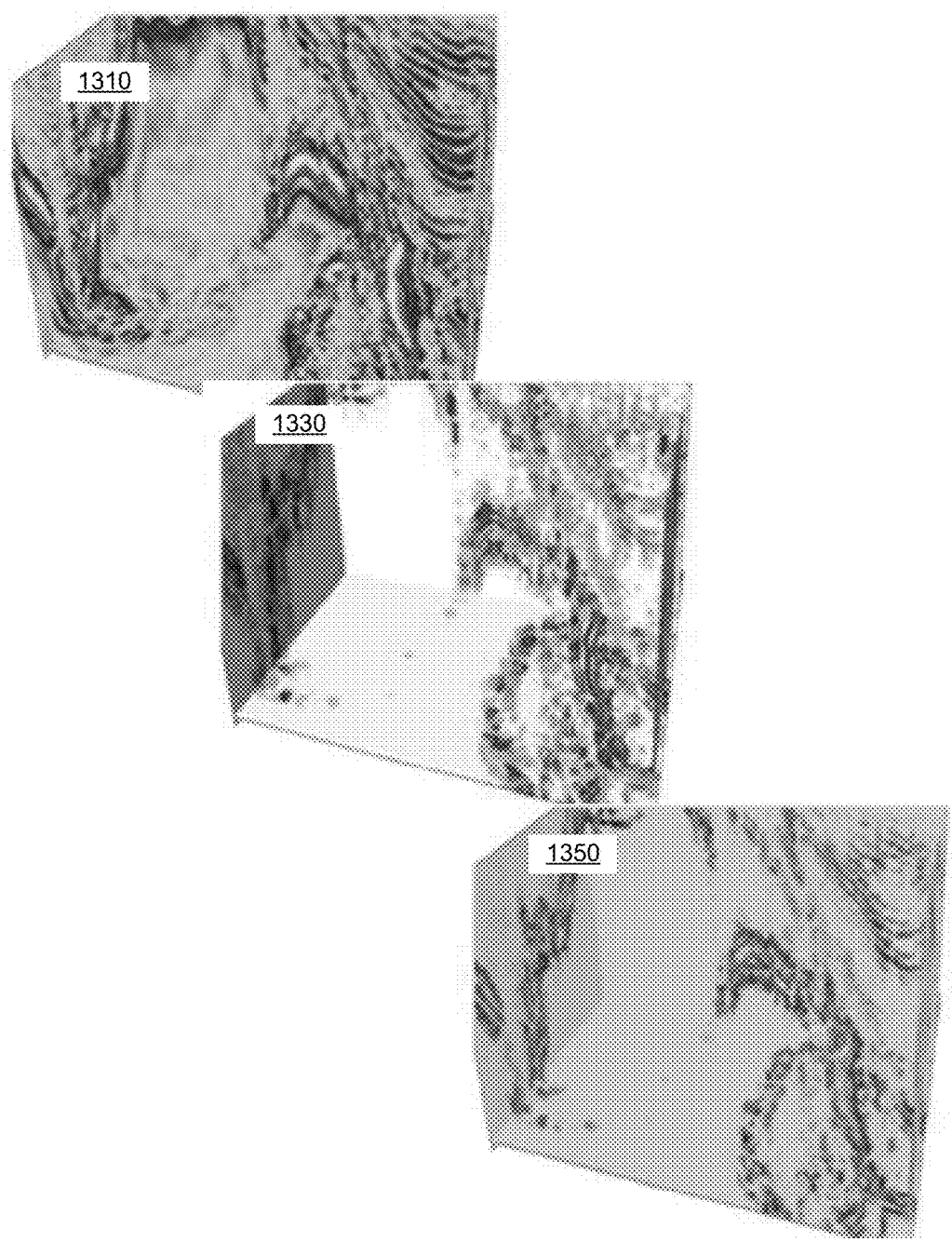
FIG. 13 illustrates examples of images of data associated with a workflow.

As an example, a STRUCT process may enhance vertical correlation of heterogeneities and attenuate incoherent features in data, for example, consider attenuation of incoherent ambient noise. FIG. 13 shows examples of images 1310, 1330 and 1350. The image 1310 corresponds to an input data cube, the image 1330 corresponds to a STRUCT attribute highlighting boundaries of a salt body, and the image 1350 corresponds to multiplication of the STRUCT attribute with the input amplitude cube (e.g., to output a SAMP cube). As shown, such a process can enhance boundaries of salt and improve quality of geobody delineation.

FIG. 14 shows examples of images 1410 and 1430 as associated with a workflow that includes ant tracking. The image 1410 corresponds to amplitude of a depth slice and the image 1430 corresponds to the same depth slice where ant tracking has been applied to a STRUCT attribute of the depth slice. As shown, ant tracking of the STRUCT attribute (e.g., attribute cube) highlights fracture tracks for brittle rocks. In the example image 1430 of FIG. 14, structural sharpening (e.g., achieved by vertical correlation of heterogeneities) improves quality of ant tracking.

Figure 15:
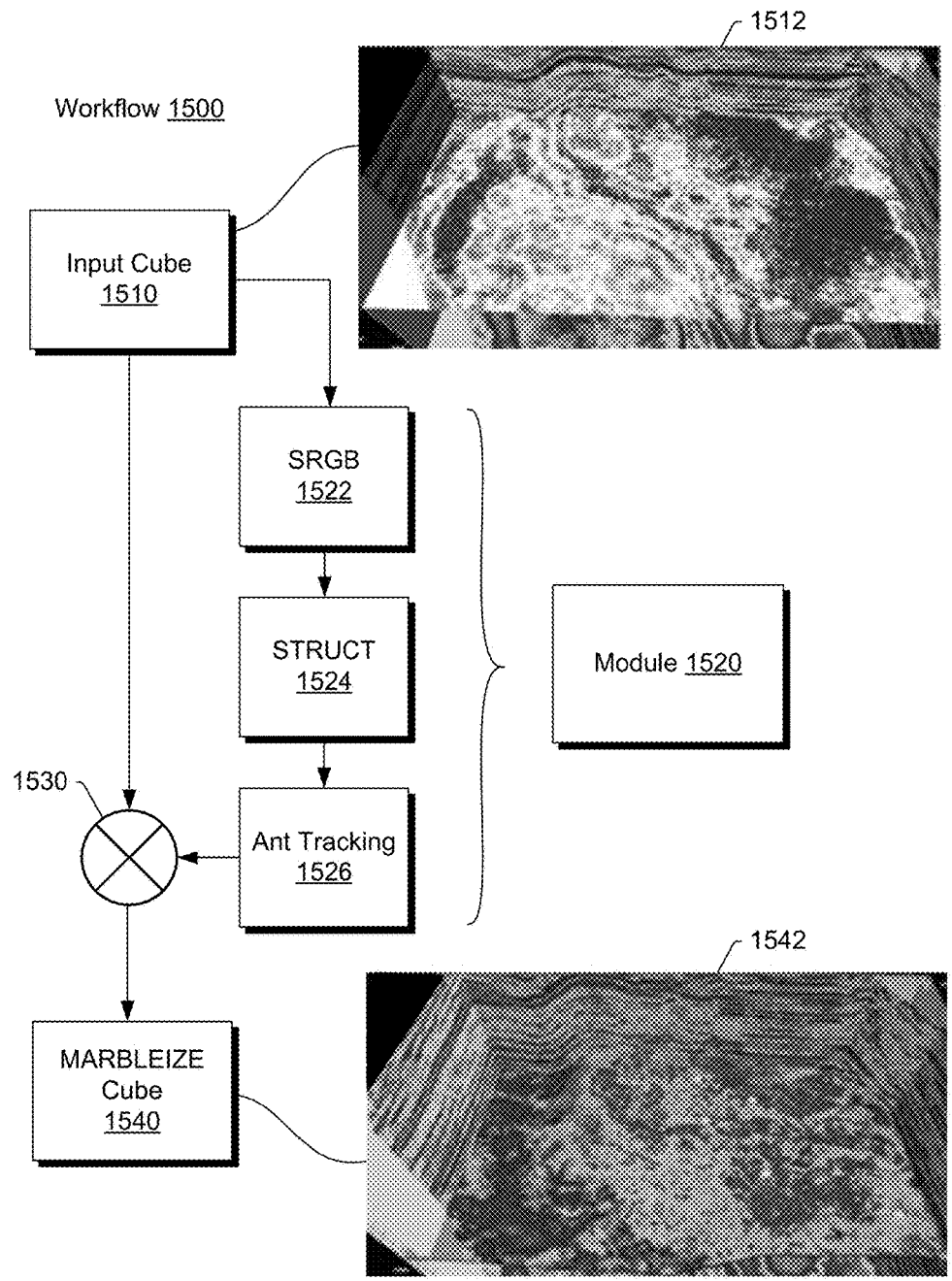
FIG. 15 illustrates an example of a workflow or method for marbleizing and examples of images of data associated with such a workflow.

FIG. 15 shows an example of a workflow 1500 for marbleizing input data. The workflow 1500 includes an input block 1510 for input of a data cube (see, e.g., an image 1512), an SRGB attribute block 1522 for performing a SRGB attribute generation process on the data cube to provide an SRGB attribute, a STRUCT attribute block 1524 for performing a STRUCT attribute generation process on the SRGB attribute to provide a STRUCT attribute, an ant tracking block 1526 for performing ant tracking on the STRUCT attribute to provide ant track data, and a merge block 1530 for merging the input data cube and the ant track data to generate a marbleized cube (e.g., marble data) and an output block 1540 for outputting the marbleized cube to a storage device, to a screen, etc. (see, e.g., an image 1542).

In the example of FIG. 15, various blocks may be provided in the form of one or more modules. For example, the blocks 1522, 1524 and 1526 may be provided in the form of a module 1520. As an example, a block may represent a workstep that may be implemented, for example, in a workflow. As an example, a workflow editor may allow for selection of various worksteps by a user that can collectively define a workflow. As an example, a marbleize workflow may include worksteps that correspond to the blocks of FIG. 15.

In the example of FIG. 15, the image 1542 represents structural information from the ant tracking of STRUCT as merged into a cube that provides both horizons from seismic reflections as well as texture from SRGB structural extraction. More particularly, in the example of FIG. 15, the image 1542 highlights the effect of marbleizing on a fractured carbonatic shale formation.

Figure 16:
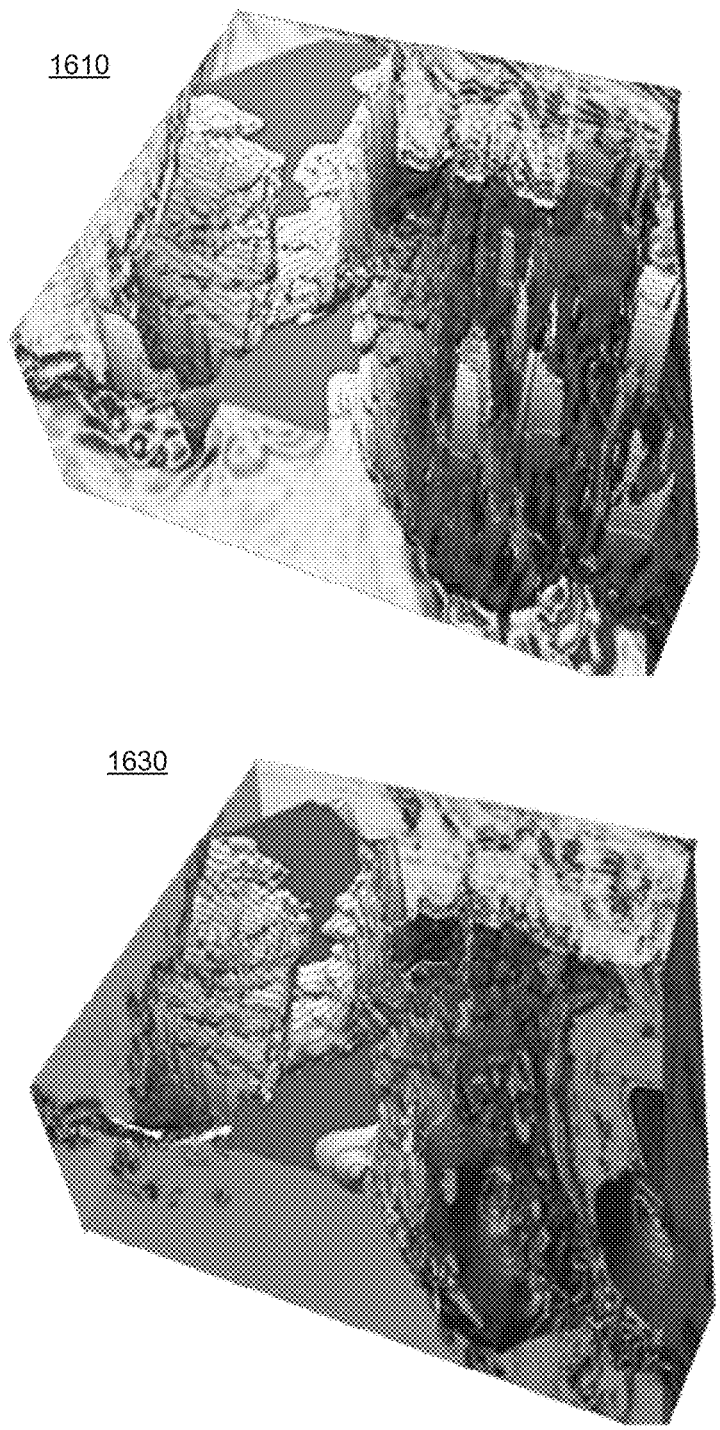
FIG. 16 illustrates examples of images of data associated with a workflow for sharpening.

FIG. 16 shows examples of images 1610 and 1630 as associated with a workflow that includes processing data based in part on lithology information. Such a workflow may be implemented, for example, based on one or more characteristics of a geological setting. As an example, a workflow may aim to improve salt body delineation through structural sharpening using a STRUCT attribute process. In FIG. 16, the image 1610 shows salt body delineation on an amplitude cube that includes structural artifacts; whereas, the image 1630 shows enhancement of salt boundaries via a STRUCT attribute that may result in more geologically meaningful delineation of the salt body.

As an example, the image 1630 of FIG. 16 may be provided via a sharpening process that enhances salt boundaries for improved delineation of salt bodies. In such an example, strong impedance contrast of the salt boundaries may be enhanced and sharpened by a STRUCT attribute process. Salt bodies can impose some issues such as blurring as a consequence of superimposed free surface and/or interbed multiples or poorly illuminated boundaries below salt overhangs. As an example, aspects of such issues may be addressed via a STRUCT attribute process, for example, through attenuation if their depth interval does not match an analysis interval of the SRGB process. In such an example, accuracy of the delineation of the salt body may be more precise (see, e.g., the image 1630).

As an example, a workflow may include SRGB-based mapping of top salt texture and stress pattern. For example, an SRGB technique may be used for direct mapping of stress fracture patterns on horizons (e.g., in a roof of a salt dome). As an example, an SRGB attribute may provide heterogeneity tracks (e.g., fracture planes) and, for example, extracting the top salt horizon from the SRGB attribute may highlight fracturing of the top salt horizon (e.g., fractured as a result of the salt diapirism).

Figure 17:
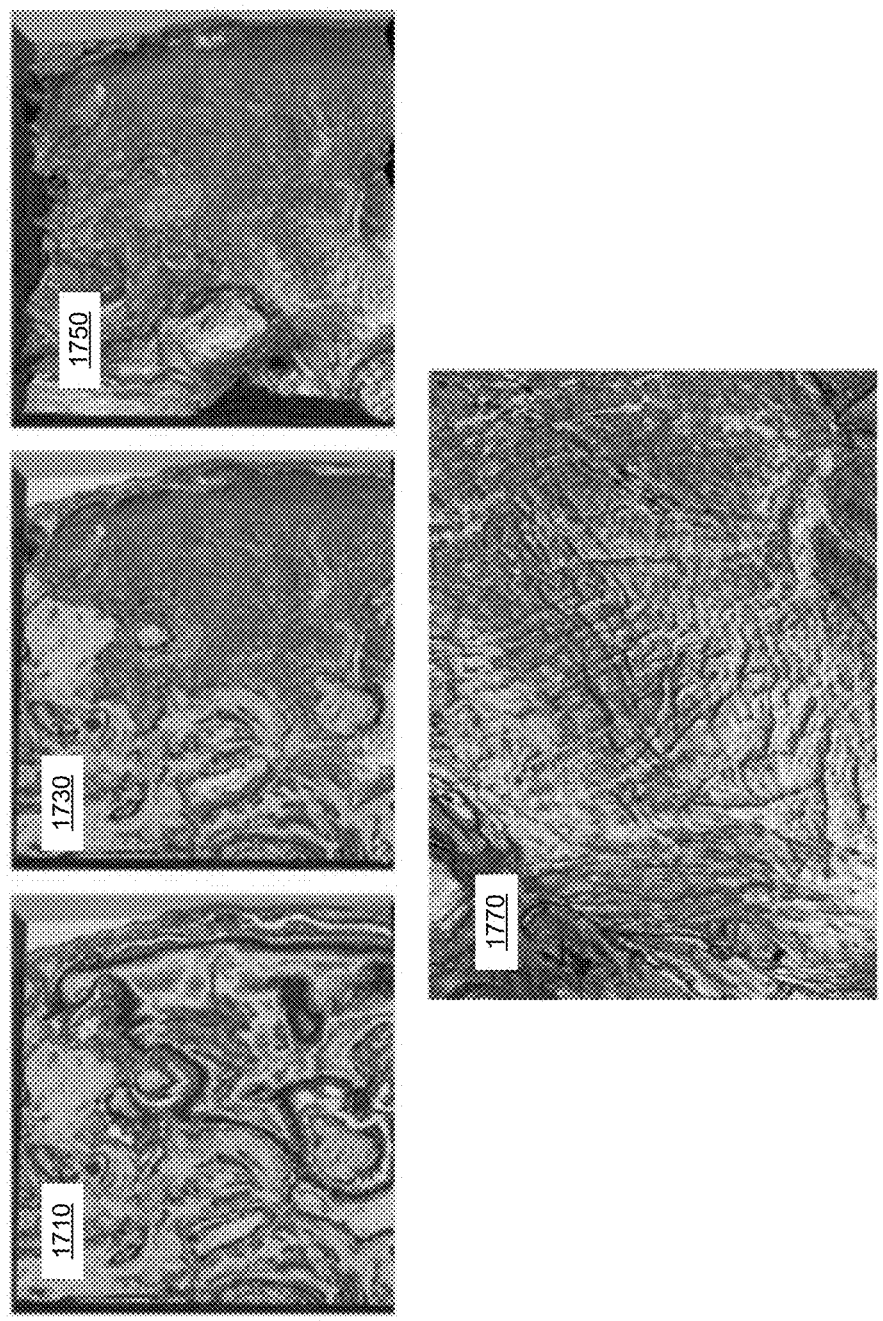
FIG. 17 illustrates examples of images of data associated with a workflow for SRGB-based mapping.

FIG. 17 shows examples of images 1710, 1730, 1750 and 1770 for purposes of illustrating SRGB-based mapping of stress fracture patterns in salt dome roofs. The image 1710 corresponds to an amplitude depth slice, the image 1730 corresponds to an SRGB attribute depth slice in part intersected by an amplitude textured horizon, the image 1750 corresponds to a stress fracture pattern in the SRGB texture of the top salt horizon and the image 1770 corresponds to stress fracture pattern (e.g., a fishbone pattern) as highlighted by SRGB-based texturing of the top salt horizon.

As an example, a workflow may include extraction of intra-salt structures ("dirty salt"). For example, a STRUCT attribute process may be adjusted to higher sensitivity to lower contrast events for purposes of detecting more subtle features such as shale blocks embedded into salt, so-called "dirty salt". As an example, delineation of such intra-salt structures via an SRGB attribute process may be performed automatically without user intervention.

Figure 18:
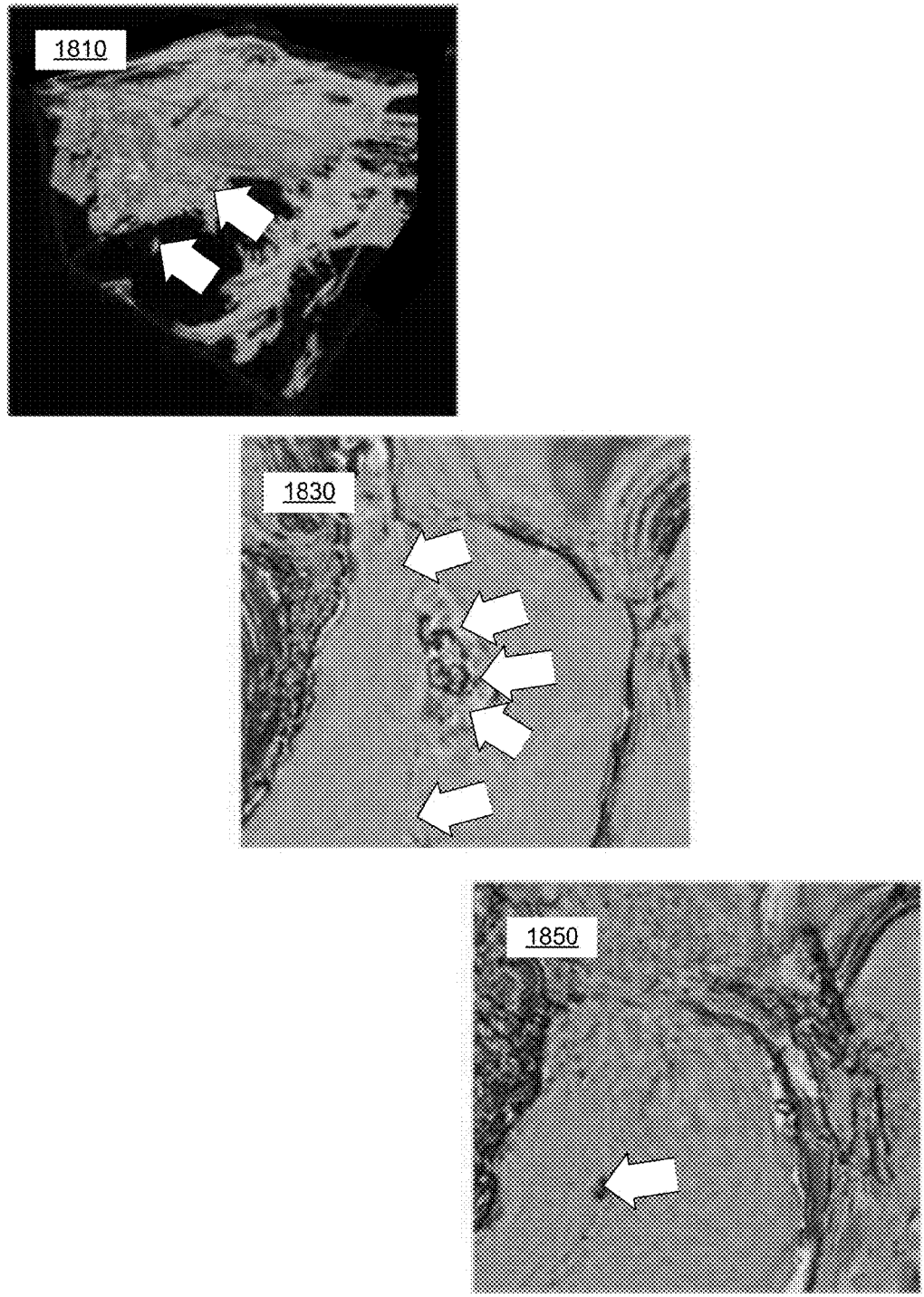
FIG. 18 illustrates examples of images of data associated with a workflow for feature extraction.

FIG. 18 shows examples of images 1810, 1830 and 1850 that illustrate a dirty salt picking process in a thick salt and salt dome area in the Gulf of Mexico, for example, as performed using an SRGB attribute process. The image 1810 corresponds to a semi-transparent amplitude cube with indications of intra-salt features, the image 1830 corresponds to highlighted center features and the image 1850 corresponds to highlighted shallow features.

As an example, a workflow may include extraction of fracture networks in brittle rocks. For example, a workflow may include ant tracking of a STRUCT attribute for purposes of extraction of fracture networks. In such an example, a fracture network may be analyzed via sections, textured horizons, semi-transparent volumes, or other portions of data.

Figure 19:
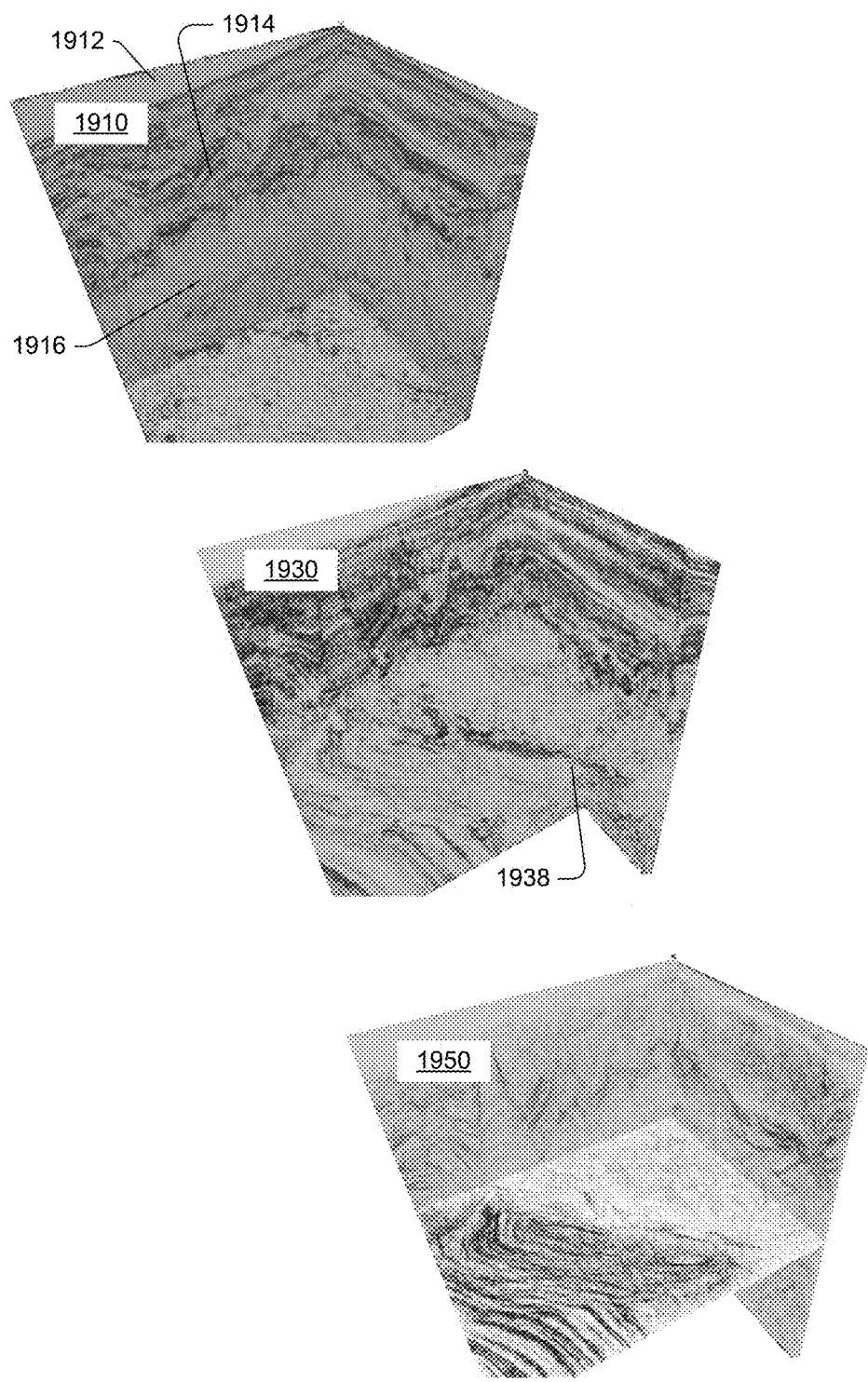
FIG. 19 illustrates examples of images of data associated with a workflow for feature extraction.

FIG. 19 shows examples of images 1910, 1930 and 1950 that illustrate various features of a formation. The image 1910 corresponds to a pre-stack depth migration (PSDM)

amplitude cube (e.g., PSDM three-dimensional amplitude data) where water 1912 exists above faulted sediments 1914 that exist above a pre-rift basement 1916. The image 1930 corresponds to application of an SRGB technique that provides for STRUCT sections (e.g., vertical sections) along with, for example, an AMP depth slice where the AMP depth slice (e.g., a horizontal section) includes a deep fault 1938. As shown in the image 1930, data may be processed using one or more processes to provide outputs that may be rendered in a single view (e.g., or in several views). The image 1950 corresponds to application of another SRGB technique that provides for an ANT(STRUCT) cube (e.g., ant tracking of a STRUCT cube). As shown, the ANT (STRUCT) cube may be "sliced" to illustrate vertical sections as well as a horizontal section (e.g., depth section). As shown in FIG. 19, various SRGB techniques may be applied to data, for example, to highlight features such as fault networks and fracture networks.

As an example, one or more of the processes implemented to generate the images (e.g., or underlying data) in the examples of FIG. 19 may be performed as part of a workflow or workflows. For example, a workflow may include processing data to output a STRUCT cube followed by ant tracking to output an ANT(STRUCT) cube. In turn, one or more visualization techniques may be applied to the output cubes, optionally in conjunction with amplitude data, for example, to generate mixed views (see, e.g., the mixed view of the image 1930). As an example, a method may render one or more of amplitude data, STRUCT data and ANT (STRUCT) data to a display, a printer, etc.

As an example, a workflow may include mapping of dissolution features in carbonates and evaporates. For example, dissolution features in certain carbonate or evaporate rocks may pose some difficulty in geophysical mapping because of low spatial resolution of measurements. Further, data processing may act to broaden reflection signals when spectral shaping filters are applied to increase apparent continuity of reflectors, which effectively results in low pass filtering.

As an example, a STRUCT attribute process may be performed, for example, on unfiltered data in an effort to preserve spatial resolution for a structural analysis. As an example, a STRUCT attribute process may be applied to different types of data. For example, such a process may be applied to: a) inverted surface wave data cubes (e.g., surface wave analysis, modeling, and inversion (SWAMI) data cubes); and b) deep pre-stack time migration (PSTM) P-wave data cubes.

Figure 20:
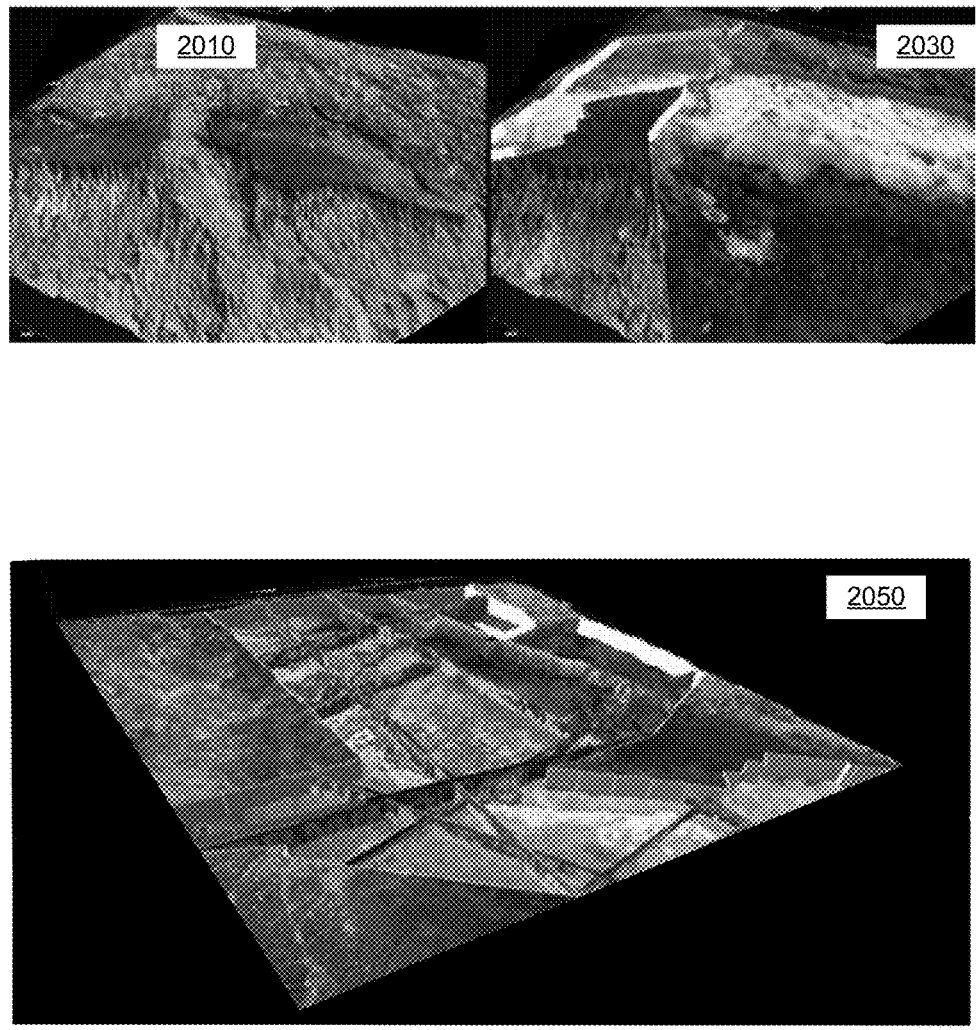
FIG. 20 illustrates examples of images of data associated with a workflow for feature mapping.

FIG. 20 shows examples of images 2010, 2030 and 2050 for a process involving SWAMI data that include indicia of karst at the surface and in the shallow near-surface. As an example, a workflow may include generating from satellite imagery a surface reference for the SRGB results from SWAMI in the near-surface. The images 2010, 2030 and 2050 illustrate embedding of SRGB attribute analysis of a SWAMI inverted surface wave velocity depth cube into a surface geological model generated from a digital elevation model (DEM) and interpreted satellite imagery. The image 2010 illustrates multi-spectral satellite image data processed for lithology, the image 2030 illustrates SRGB attribute textured shallow horizon from SWAMI inverted surface waves inserted into satellite based surface model, and the image 2050 illustrates co-rendering of vertical sections through the SWAMI velocity volume embedded into the satellite-based surface model.

Figure 21:
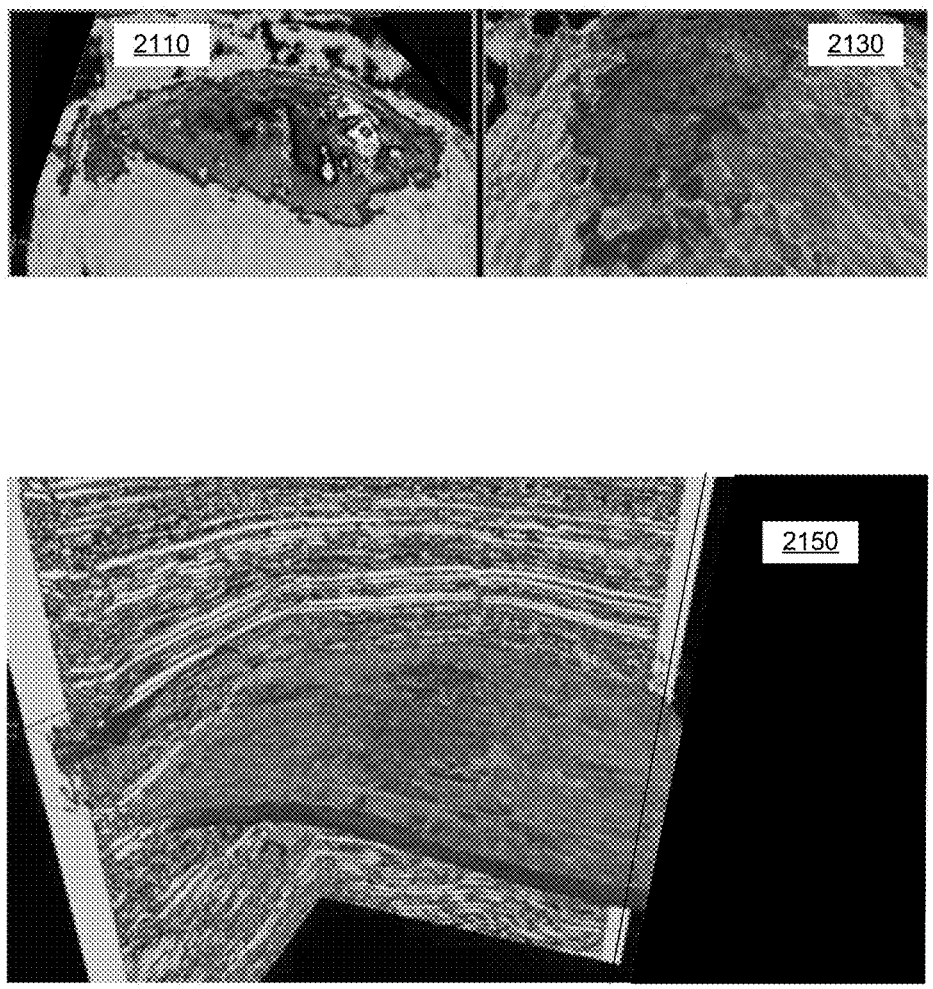
FIG. 21 illustrates examples of images of data associated with a workflow for mapping.

FIG. 21 shows examples of images 2110, 2130 and 2150 for an SRGB attribute process that was performed on data from a 2500 meter deep palaeo-karst in a Cretaceous limestone. The SRGB analysis was performed after flattening the PSTM data cube on the horizon at the top of the limestone in an effort to avoid the strong signals from the intersection of dipping layers with the analysis plains. After extraction of four cubes—red, green, blue and STRUCT—the flattening in data sets was reversed to obtain the original geometry of the input data cube. After extraction of the karsted limestone as a geobody the variance attribute may be, for example, used to visualize the rock layer.

In FIG. 21, the image 2110 corresponds to a surface of karsted limestone co-rendered from an SRGB attribute and a variance attribute, the image 2130 highlights holes in the top of the karsted limestone from the SRGB attribute of the variance attribute, and the image 2150 illustrates extraction of the karsted limestone as a geobody using SRGB attribute for preprocessing and the variance attribute for the visualization.

As an example, a workflow can include processing for discrimination of brittle rocks. For example, a workflow may include fracture detection and delineation using an SRGB attribute process through a STRUCT attribute for discrimination of rocks by distinguishing rocks, which react competently to stress by cracking, from incompetent rocks releasing stress through plastic deformation. In such an example, competent rocks may show a high fracture density whereas incompetent plastic rocks may show a relatively lower fracture density.

Figure 22:
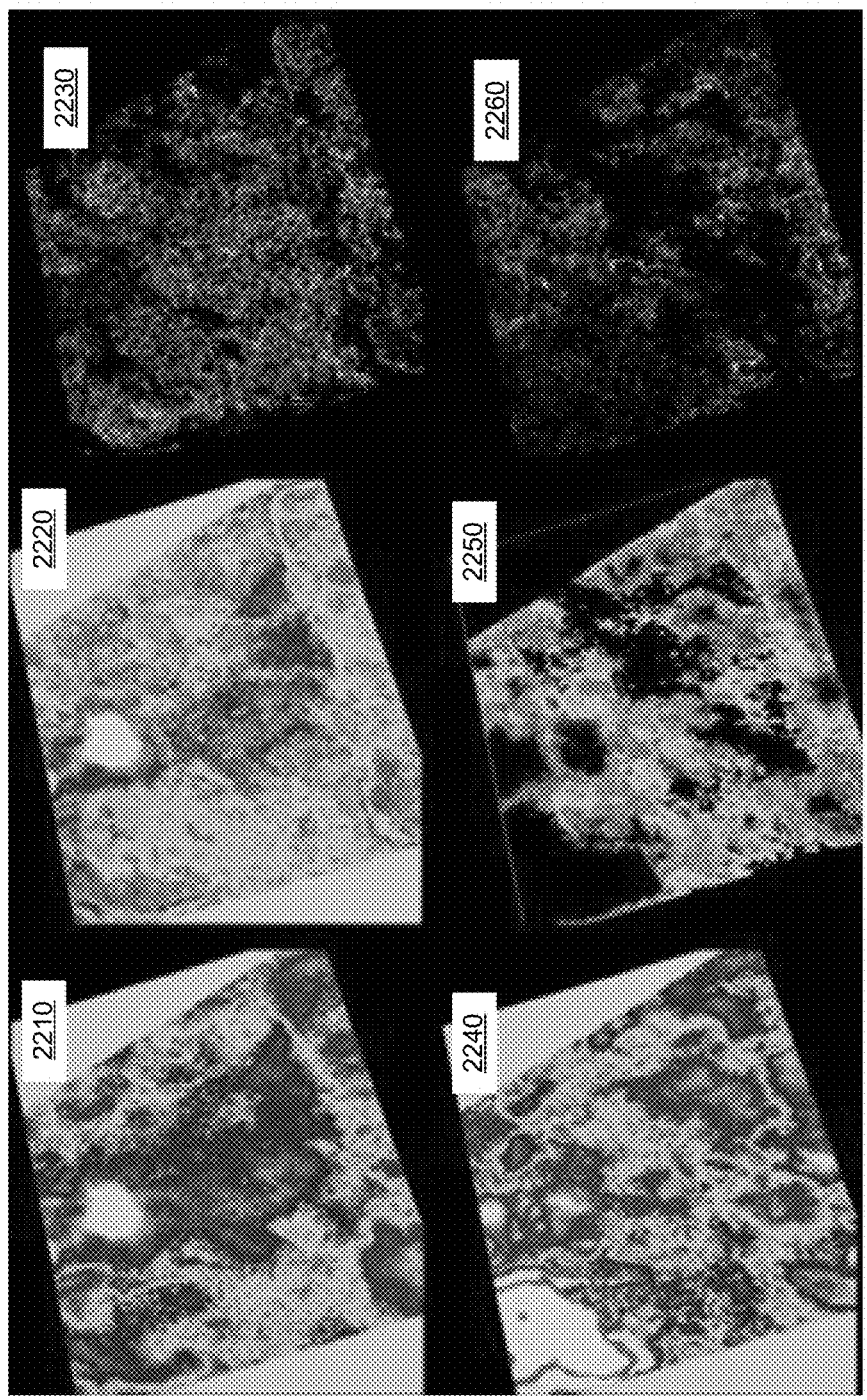
FIG. 22 illustrates examples of images of data associated with a workflow for feature discrimination.

FIG. 22 shows examples of images 2210, 2220, 2230, 2240, 2250 and 2260 to help demonstrate how SRGB attribute processing of a variance attribute can allow for the discrimination of a competent and highly fractured limestone (see, e.g., images 2210, 2220 and 2230) from an incompetent, plastic shaly sediment (see, e.g., images 2240, 2250 and 2260). Differences in stress competence can be quantified by the fracture density, for example, as shown in ant tracking of the STRUCT attribute (see, e.g., right column in the image 2260).

Thus, FIG. 22 shows discrimination of competent and plastic rocks through fracture density mapped by an SRGB attribute where the image 2210 represents a competent limestone via an amplitude depth slice, the image 2220 represents an SRGB attribute from a variance attribute, the image 2230 represents ant tracking of the STRUCT attribute from the variance attribute; and where the image 2240 represents a clastic sediment via an amplitude depth slice, the image 2250 represents an SRGB attribute of a variance attribute, and the image 2260 represents ant tracking of the STRUCT attribute from the variance attribute.

As an example, a workflow may include structural mapping in presence of folded and faulted structures. For example, a workflow may include removing large scale structures such as anticlines, folds and faults by flattening prior to application of an SRGB attribute process.

Figure 23:
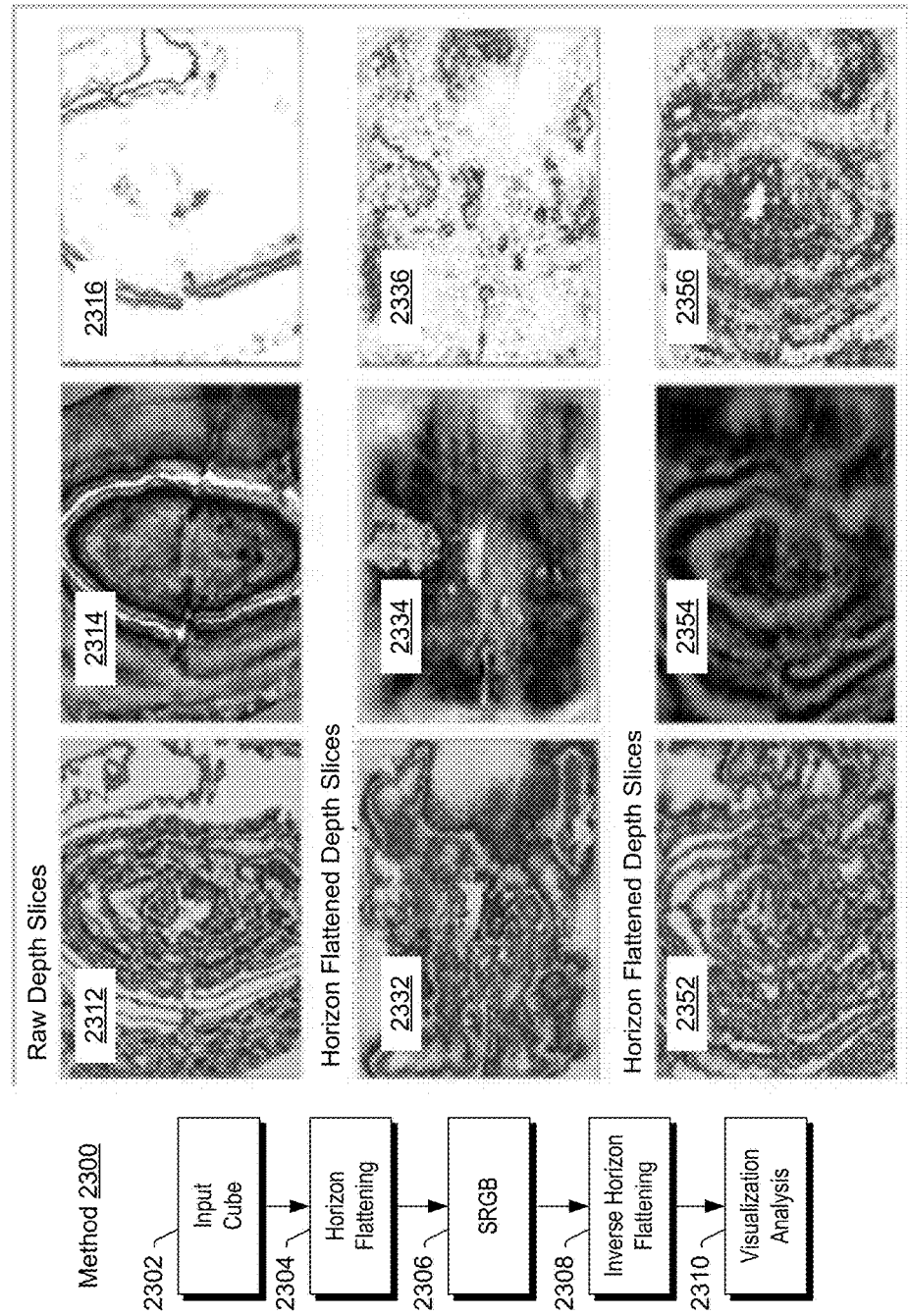
FIG. 23 illustrates an example of a method or workflow for feature mapping and examples of images of data associated with the method.

FIG. 23 shows an example of a method 2300 and various examples of images 2312, 2314, 2316, 2332, 2334, 2336, 2352, 2354, and 2356. The method 2300 includes an input block 2302 for input of a data cube, a horizon flattening block 2304 for horizon flattening, an SRGB attribute block 2306 for performing an SRGB attribute process, an inverse horizon flattening block 2308 for inverse horizon flattening and a visualization analysis block 2310 for visualizing one or more features. As an example, a framework such as the PETREL® framework may include one or more algorithms for horizon flattening (e.g., provided for performing structural interpretation, etc.). As an example, a flattened section may be a seismic section that has been redisplayed such that a reflection of interest not horizontal in an original display appears horizontal and flat. Such a process may provide, for example, insight as to geological conditions at the time a given sedimentary layer accumulated.

In FIG. 23, the various images illustrate a regional effect and its removal at a smooth anticlinal structure represented by series of amplitude slices (see, e.g., the images 2312, 2332 and 2352), a series of SRGB slices (see, e.g., the images 2314, 2334 and 2354) and a series of STRUCT slices (see, e.g., the images 2316, 2336 and 2356). The images 2312, 2314 and 2316 show raw depth data where the intersections of the strong top limestone reflector dominate the slices to such a degree that the karst holes are only faintly visible in the SRGB image 2314. Flattening with an accurate horizon removes this effect and extracts subtle structure of the top limestone with faults and delicate karst features. When reversing the flattening, the strong dipping events return in flat depth slices. To preserve structural information in an unbiased manner, the inverse flattened cube may be visualized using texturing of horizons.

In FIG. 23, image 2312 corresponds to top limestone topography extraction of PSTM amplitude, the image 2314 corresponds to extraction of RGB directly from the PSTM cube and the image 2316 corresponds to extraction of SRGB after flattening and inverse flattening; the image 2332 corresponds to top limestone topography extraction of PSTM amplitude, the image 2334 corresponds to extraction of RGB directly from the PSTM cube, and the image 2336 corresponds to extraction of SRGB after flattening and inverse flattening; and the image 2352 corresponds to depth contours of top limestone horizon for a depth slice of PSTM amplitude, the image 2354 corresponds to extraction of ant tracking of STRUCT attribute, and the image 2356 corresponds to extraction of a marbleize cube.

Figure 24:
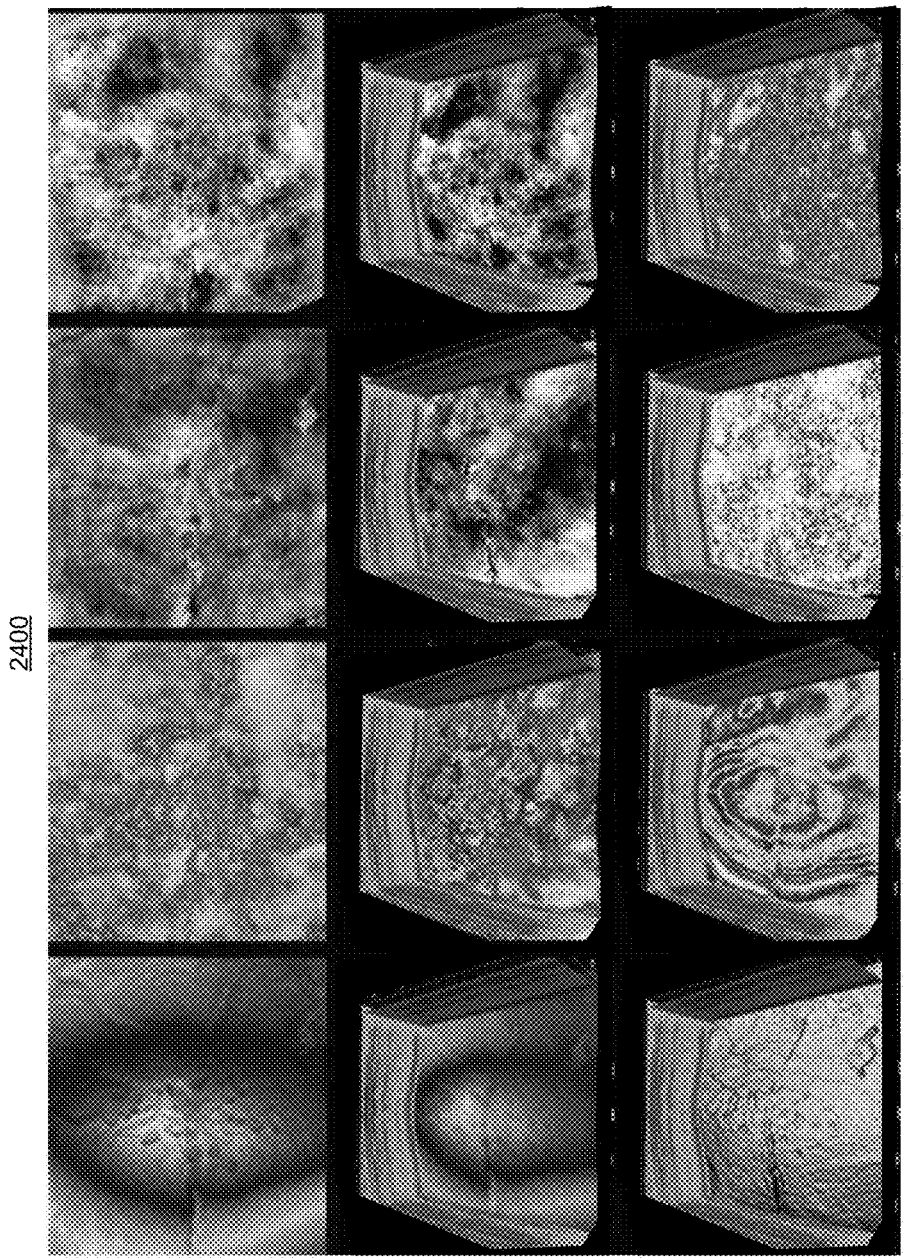
FIG. 24 illustrates examples of images of data associated with a workflow for feature mapping.

FIG. 24 shows a series of images 2400 as associated with structural analysis of a karsted limestone in an anticlinal structure. The top row of images correspond to projection of textured horizons onto flat surface thus avoiding distortion introduced from dipping anticlinal reflectors and the middle and bottom rows of images correspond to SRGB attribute processing for texturing the top limestone horizon.

Figure 25:
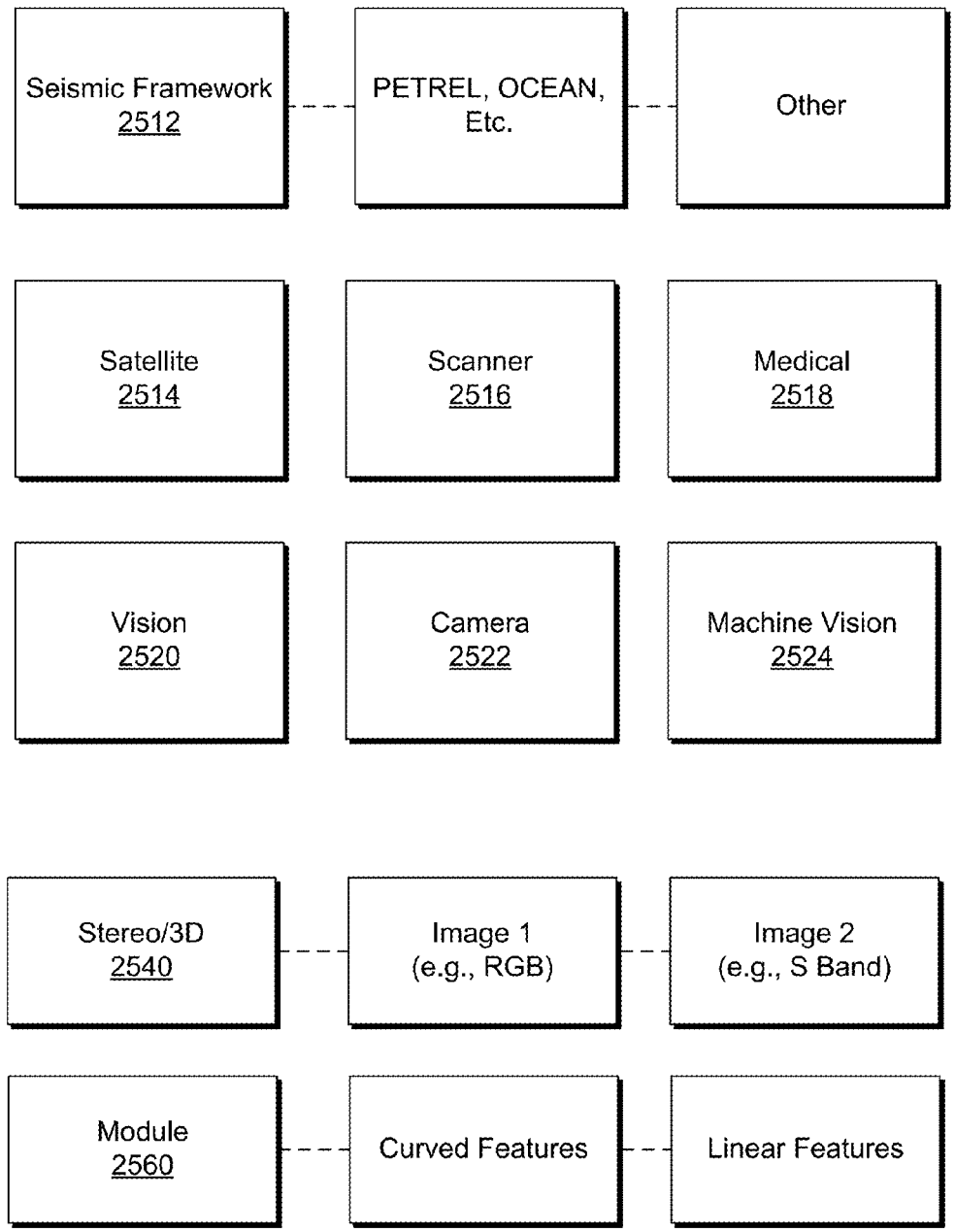
FIG. 25 illustrates examples of methods, modules, etc.

FIG. 25 shows various examples of technologies, techniques, etc., which may implement a process such as a sharpened RGB (e.g., an SRGB) process.

As an example, an SRGB process can include generating outputs such as, for example, (i) a structural cube (e.g., STRUCT attribute cube); and (ii) a cube of sharpened RGB voxels (e.g., SRGB attribute cube based on STRUCT). As mentioned, one or more workflows may include a STRUCT attribute and/or an SRGB attribute, for example, for data analysis, enhanced extraction of structural information from seismic data cubes, etc. As an example, an SRGB attribute process may be applied on at least two channels (e.g., R and G, "R-G" or "G-R", etc.).

As an example, various types of data may be processed, for example, where data processed may be selected as including some common structural features. Some examples of data types include: (a) satellite data (e.g., visible, microwave, etc.); (b) medical data (e.g., MR, CT, PET, Ultrasound, etc.); and (c) non-satellite IR, UV, microwave, visible data, etc.

Various techniques may be implemented in the context of, for example: seismic-to-simulation frameworks (e.g., PETREL®, OCEAN®, etc.) 2512; satellite imagery analyzers 2514; scanners 2516; medical imagers, treatment planners (e.g., radiosurgery, etc.) 2518; vision monoculars, goggles, etc. 2520; still or video cameras 2522; machine vision equipment (e.g., for quality control, locating, etc.) 2524.

As an example, a method may include presenting multiple images. For example, a stereo or 3D module 2540 may provide for presentation of a first image and a second image. Such an approach may apply one or more techniques such as display techniques, glasses techniques, etc., for example, as implemented for stereovision, 3D effect, etc. Such an approach may be implemented to "convolute" images. For example, a first image may be an RGB image and a second image may include saturation data or enhanced saturation data. In such a manner, a user may see a convoluted image without generation of convoluted data (e.g., a convoluted data file).

As an example, binoculars may be provided with circuitry for processing image data to provide in near real-time sharpened images. For example, such binoculars may present in one or both monoculars S band data or enhanced S band data based on image data from an image being viewed. As an example, consider a field engineer viewing structures in an exposed formation where circuitry processes an image of the exposed formation and generates information for overlay to enhance the field engineer's view. Such information may include S band data or enhanced S band data (e.g., enhanced via application of an edge detection algorithm). As an example, a still or video camera may include circuitry for near real-time processing of image data to generate enhanced image data (e.g., via S band data) where the enhanced image data may be rendered to one or more displays.

As an example, a machine vision system may include circuitry for processing image data to generate enhanced image data (e.g., via S band data). In such an example, a quality control or other process may act upon the enhanced image data, for example, to identify defects in a product, assess quality of a product, etc.

As an example, a medical imaging system may include circuitry for processing image data to generate enhanced image data (e.g., via S band data). In such an example, a diagnosis process may act upon the enhanced image data, for example, to identify features in bone (e.g., fractures), tumors, etc. As an example, data from more than one medical imaging system may be input and processed to generate enhanced image data (e.g., via S band data). For example, CT and MR data may be combined in a continuous color model and transformed to provide S band data, which, in turn, may be enhanced via application of one or more enhancement algorithms (e.g., edge detection, etc.).

As an example, a module 2560 may provide for enhancement of curved features, linear features or linear features and curved features. Such a module may optionally be implemented to process data from medical imaging, satellite imagery, machine vision, etc. As an example, identified linear features may be highlighted and identified curved features may be highlighted and, for example, combined into a single view (e.g., on a display, on displays, etc.).

As an example, a process may process data for attributes, frequencies, layers, data types, etc. in a continuous color mapping (e.g., according to an RGB color model). Such a process may act to increase dynamic range of the data. As an example, such data may be transformed to data that conforms to a HSV color model.

As an example, consider turning an RGB color cube on its black corner running up to its white corner such that hue and chroma can be defined by projecting the RGB cube as a hexagon to form a "chromaticity plane" where chroma is the relative size of the hexagon passing through a point, and hue is how far around that hexagon's edge the point lies. In such an example, saturation can be defined as either the ratio of colorfulness to brightness or of chroma to lightness. In such an example, saturation may be defined to range from 0 along the axis to 1 at the most colorful point for each pair of other parameters (i.e., hue and chroma).

As an example, a MATLAB® software algorithm "rgb2hsv" may be implemented to convert from an RGB color model to a HSV color model where:
 cmap=rgb2hsv(M)
 hsv_image=rgb2hsv(rgb_image)

In such an example, cmap=rgb2hsv(M) converts an RGB colormap M to an HSV colormap cmap where both colormaps are m-by-3 matrices. The elements of both colormaps are in the range 0 to 1. In such an example, columns of the input matrix M represent intensities of red, green, and blue, respectively and columns of the output matrix cmap represent hue, saturation, and value, respectively.

In the foregoing example, hsv_image=rgb2hsv(rgb_image) converts an RGB image to a HSV image where RGB is an m-by-n-by-3 image array whose three planes contain the red, green, and blue components for the image and HSV is returned as an m-by-n-by-3 image array whose three planes contain the hue, saturation, and value components for the image.

As an example, a method can operate on saturation data (e.g., S band data). Such a method may include running edge detection on saturation values and optionally display edge contours in grayscale. In such an example, where three sets of data are input as R, G, B, respectively, and transformed to a HSV color model to provide S band data, the edges may be based on the three sets of data. As an example, a method may include convolving edge data (e.g., enhanced S band data) with an RGB Image to generate a sharpened RGB image. As noted, a method may include presenting two images to produce for a viewer a combined (e.g., convolved) image (e.g., consider stereovision, interlacing, "screen door" approaches).

As an example, a device may be a mobile device that includes one or more network interfaces for communication of information. For example, a mobile device may include a wireless network interface (e.g., operable via Institute of Electrical and Electronics Engineers (IEEE) 802.11, European Telecommunications Standards Institute (ETSI) Global System for Mobile communication (GSM), BLUETOOTH®, satellite, etc.). As an example, a mobile device may include components such as a main processor, memory, a display, display graphics circuitry (e.g., optionally including touch and gesture circuitry), a subscriber identity module (SIM) slot, audio/video circuitry, motion processing circuitry (e.g., accelerometer, gyroscope), wireless local area network (LAN) circuitry, smart card circuitry, transmitter circuitry, global positioning system (GPS) circuitry, and a battery. As an example, a mobile device may be configured as a cell phone, a tablet, etc. As an example, a method may be implemented (e.g., wholly or in part) using a mobile device. As an example, a system may include one or more mobile devices.

Figure 26:
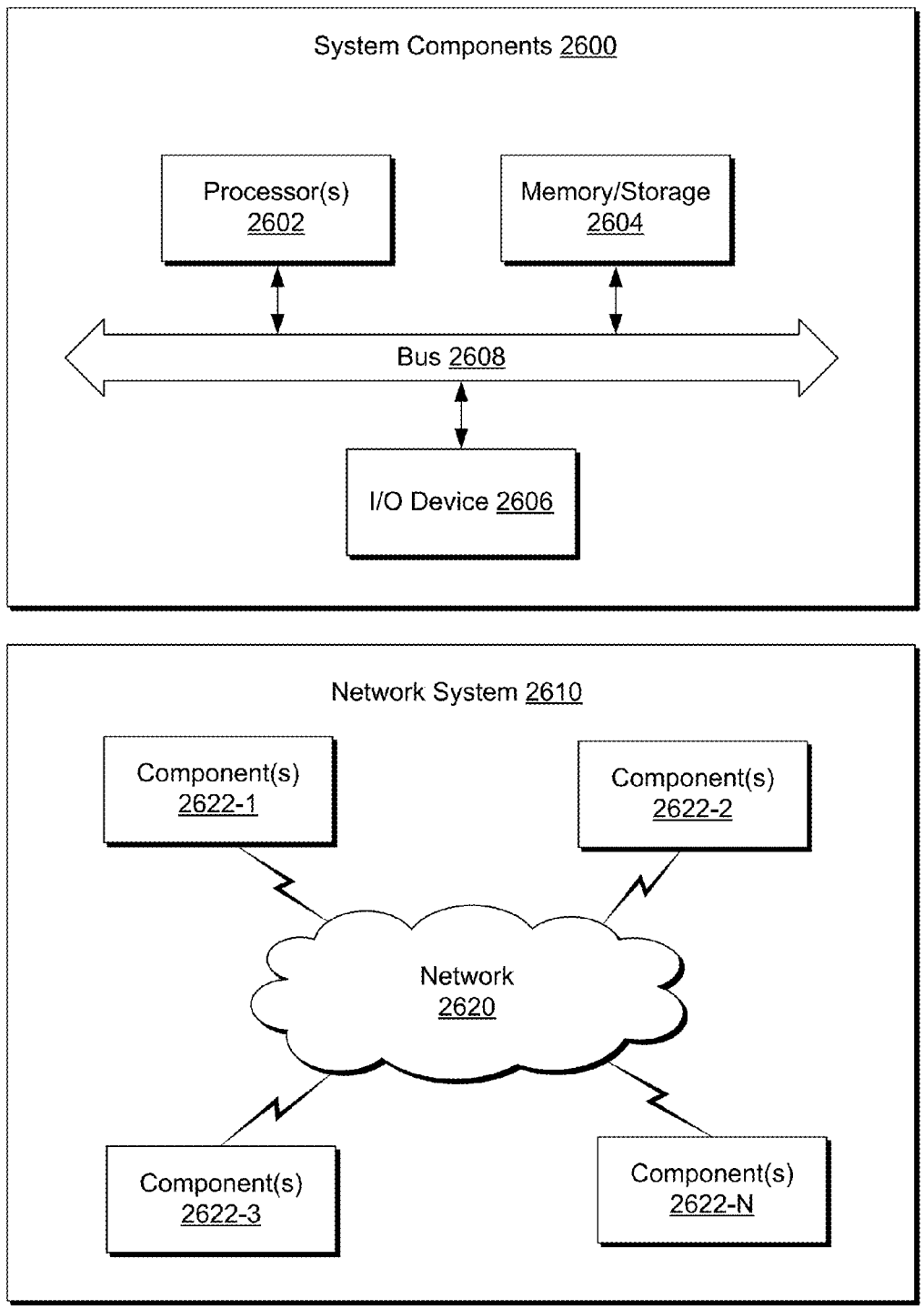
FIG. 26 illustrates example components of a system and a networked system.

FIG. 26 shows components of an example of a computing system 2600 and an example of a networked system 2610. The system 2600 includes one or more processors 2602, memory and/or storage components 2604, one or more input and/or output devices 2606 and a bus 2608. In an example embodiment, instructions may be stored in one or more computer-readable media (e.g., memory/storage components 2604). Such instructions may be read by one or more processors (e.g., the processor(s) 2602) via a communication bus (e.g., the bus 2608), which may be wired or wireless. The one or more processors may execute such instructions to implement (wholly or in part) one or more attributes (e.g., as part of a method). A user may view output from and interact with a process via an I/O device (e.g., the device 2606). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 2610. The network system 2610 includes components 2622-1, 2622-2, 2622-3, . . . 2622-N. For example, the components 2622-1 may include the processor(s) 2602 while the component(s) 2622-3 may include memory accessible by the processor(s) 2602. Further, the component(s) 2602-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
   providing data from at least two data sets in a continuous color model that comprises at least two color axes;
   transforming the data from the continuous color model to a hue, saturation and value color model to generate at least saturation data;
   applying an edge detection algorithm to the saturation data to generate enhanced data; and
   rendering at least a portion of the enhanced data to a display.

2. The method of claim 1 wherein the continuous color model comprises an RGB color model.

3. The method of claim 1 wherein the data comprises geophysical data.

4. The method of claim 3 wherein the geophysical data comprises seismic data.

5. The method of claim 1 wherein the data comprises satellite imagery data.

6. The method of claim 1 wherein the data comprises data from at least two different sources.

7. The method of claim 1 wherein the at least two data sets comprise a satellite imagery data set and a seismic data set.

8. The method of claim 1 comprising convolving at least a portion of the data in the continuous color model with at least a portion of the enhanced data.

9. The method of claim 1 comprising convolving at least a portion of the data in the continuous color model with at least a portion of the saturation data.

10. The method of claim 1 wherein the at least two data sets comprise a data set for a first attribute and a data set for a second attribute.

11. The method of claim 10 wherein the first attribute and the second attribute comprise frequency attributes.

12. The method of claim 10 wherein the first attribute and the second attribute comprise attributes derived from time slice data of a seismic cube.

13. The method of claim 10 wherein the first attribute and the second attribute are selected to attenuate noise.

14. A system comprising:
   one or more processors for processing information;
   memory operatively coupled to the one or more processors; and
   modules that comprise instructions stored in the memory and executable by at least one of the one or more processors, wherein the modules comprise:
      a continuous color model module for providing data from at least two data sets in a continuous color model that comprises at least two color axes;
      a transformation module for transforming the data from the continuous color model to a hue, saturation and value color model to generate at least saturation data; and
      an application module for applying an edge detection algorithm to the saturation data to generate enhanced data.

15. The system of claim 14 comprising a convolution module for convolving at least a portion of the data in the continuous color model with at least a portion of the enhanced data.

16. The system of claim 14 comprising a convolution module for convolving at least a portion of the data in the continuous color model with at least a portion of the saturation data.

17. The system of claim 14 comprising an attribute selection module for selecting an attribute to provide at least one of the data sets.

* * * * *